(12) United States Patent
Lu et al.

(10) Patent No.: US 12,517,591 B1
(45) Date of Patent: Jan. 6, 2026

(54) PINCH SLIDERS FOR USE WITH HANDS

(71) Applicant: Snap Inc., Santa Monica, CA (US)

(72) Inventors: Katie Lu, Santa Monica, CA (US); Daria Skrypnyk, Beverly Hills, CA (US); Karen Stolzenberg, Venice, CA (US); Lien Le Hong Tran, Santa Monica, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/825,896

(22) Filed: Sep. 5, 2024

(51) Int. Cl.
  *G06F 3/01* (2006.01)
  *G06F 3/04815* (2022.01)
  *G06F 3/04847* (2022.01)

(52) U.S. Cl.
  CPC .......... *G06F 3/017* (2013.01); *G06F 3/04815* (2013.01); *G06F 3/04847* (2013.01)

(58) Field of Classification Search
  CPC .......... G06F 3/011; G06F 3/012; G06F 3/013; G06F 3/04847; G06T 19/006; G02B 27/017
  See application file for complete search history.

(56) References Cited

U.S. PATENT DOCUMENTS

| | | | |
|---|---|---|---|
| 10,515,484 B1 | 12/2019 | Lucas et al. | |
| 10,852,814 B1 | 12/2020 | Caron et al. | |
| 11,361,735 B1 | 6/2022 | Wang et al. | |
| 2011/0050562 A1 | 3/2011 | Schoen et al. | |
| 2017/0178260 A1* | 6/2017 | Wilde | G06Q 10/02 |
| 2018/0004392 A1 | 1/2018 | Yang et al. | |
| 2018/0046245 A1 | 2/2018 | Schwarz et al. | |
| 2018/0349690 A1 | 12/2018 | Rhee et al. | |
| 2020/0226814 A1 | 7/2020 | Tang et al. | |
| 2021/0004146 A1 | 1/2021 | Linville et al. | |
| 2022/0197392 A1* | 6/2022 | Zhou | G06F 3/017 |
| 2022/0374138 A1* | 11/2022 | Zhou | G06F 3/04847 |
| 2023/0297161 A1 | 9/2023 | Moll | |
| 2024/0402969 A1* | 12/2024 | Peebler | G06F 3/011 |
| 2025/0104335 A1* | 3/2025 | Huang | G06T 19/003 |

OTHER PUBLICATIONS

Lolambean (Ed.). (Jun. 23, 2022). SlidersZ—MRTK 2. Sliders— MRTK 2 | Microsoft Learn. https://learn.microsoft.com/en-us/ windows /mixed-reality/mrtk-unity/mrtk2/features/ux-building-blocks/sliders?view=mrtkunity-2022-05 (Year: 2022).*

* cited by examiner

*Primary Examiner* — Koosha Sharifi-Tafreshi
(74) *Attorney, Agent, or Firm* — SCHWEGMAN LUNDBERG & WOESSNER, P.A.

(57) ABSTRACT

An eXtended Reality (XR) system is provided that generates an interactive XR user interface including 3D sliders for inputting a value for a variable. The XR system renders a 3D slider using a set of attributes and displays the 3D slider to a user as a component of the XR user interface. The XR system detects a pinch gesture of a hand of the user in proximity to the 3D slider. In response to detecting the pinch gesture, the XR system renders the 3D slider using a set of attributes and re-displays the 3D slider to the user.

20 Claims, 15 Drawing Sheets

US 12,517,591 B1

PINCH SLIDERS FOR USE WITH HANDS

TECHNICAL FIELD

The present disclosure relates generally to user interfaces and, more particularly, to user interfaces used for extended reality.

BACKGROUND

A head-wearable apparatus can be implemented with a transparent or semi-transparent display through which a user of the head-wearable apparatus can view the surrounding environment. Such head-wearable apparatuses enable a user to see through the transparent or semi-transparent display to view the surrounding environment, and to also see objects (e.g., objects such as a rendering of a 2D or 3D graphic model, images, video, text, and so forth) that are generated for display to appear as a part of, and/or overlaid upon, the surrounding environment. This is typically referred to as "augmented reality" or "AR." A head-wearable apparatus can additionally completely occlude a user's visual field and display a virtual environment through which a user can move or be moved. This is typically referred to as "virtual reality" or "VR." In a hybrid form, a view of the surrounding environment is captured using cameras, and then that view is displayed along with augmentation to the user on displays the occlude the user's eyes. As used herein, the term eXtended Reality (XR) refers to augmented reality, virtual reality and any of hybrids of these technologies unless the context indicates otherwise.

A user of the head-wearable apparatus can access and use a computer software application to perform various tasks or engage in an activity. To use the computer software application, the user interacts with a user interface provided by the head-wearable apparatus.

BRIEF DESCRIPTION OF THE SEVERAL VIEWS OF THE DRAWINGS

In the drawings, which are not necessarily drawn to scale, like numerals can describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1A:
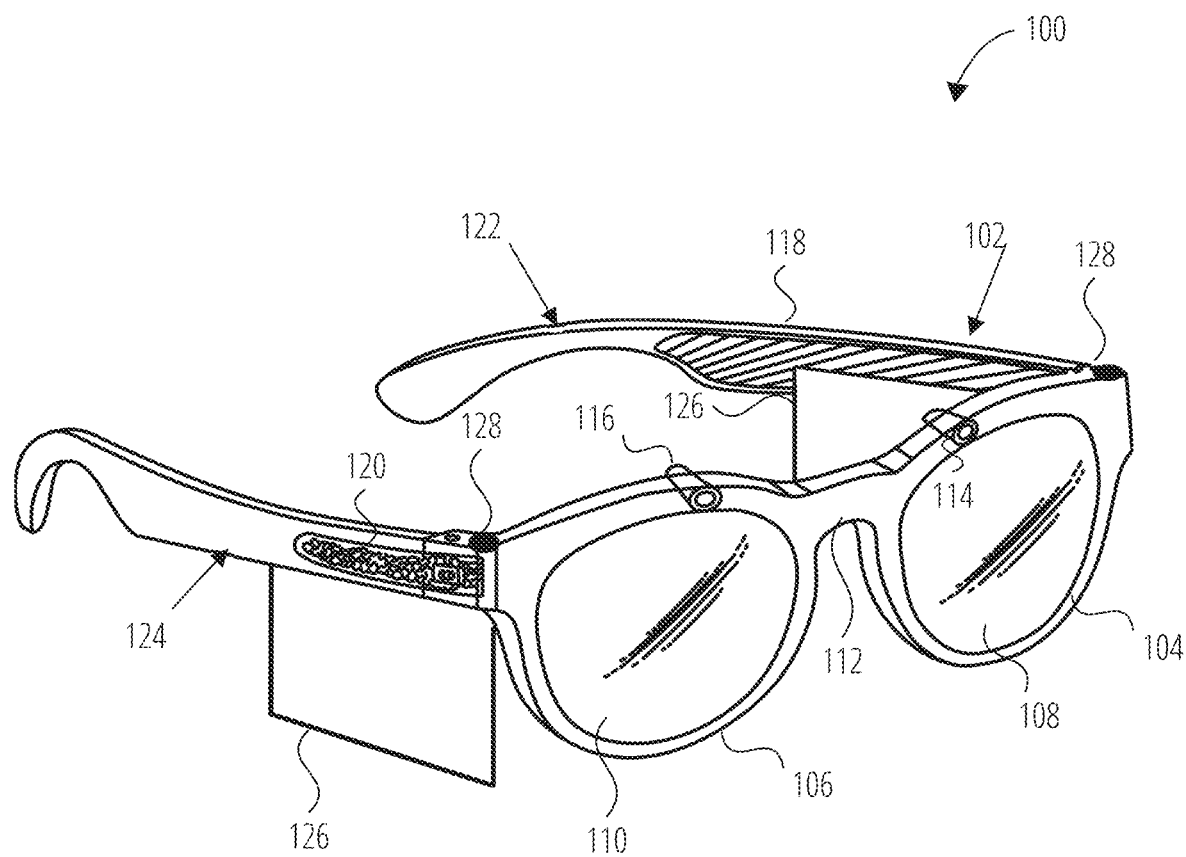
FIG. 1A is a perspective view of a head-wearable apparatus, according to some examples.

Extended Reality (XR) systems have introduced new ways for users to interact with digital interfaces, but they also present unique challenges in user interface design. Traditional 2D interface elements, such as sliders and buttons, do not translate well to 3D environments where users interact using hand gestures rather than physical input devices. This mismatch can lead to unintuitive and frustrating user experiences, particularly when users attempt to manipulate precise controls in a virtual space. Additionally, the lack of tactile feedback in XR environments can make it difficult for users to gauge the effect of their interactions, potentially resulting in unintended adjustments to system settings.

Another challenge in XR user interfaces is accounting for the limitations of hand tracking technology. Hand movements in free space can be jittery and imprecise, which can lead to accidental inputs or difficulty in making fine adjustments to controls. This issue is particularly problematic for slider controls, where small movements can result in large changes to the associated value. Furthermore, the absence of physical constraints in virtual environments can make it challenging for users to understand the boundaries and limits of interactive elements, potentially leading to confusion and reduced usability of the interface.

In some examples, an XR system implements a 3D slider with a spherical control element that moves along a half-capsule or half-cylinder track. This design provides a more intuitive and natural way for users to interact with slider controls in a 3D environment, bridging the gap between traditional 2D interfaces and XR interactions.

In some examples, the spherical control element offers a clear target for hand gestures, making it easier for users to manipulate precise controls in virtual space.

In some examples, to address the lack of tactile feedback, the XR system can incorporate visual and tactile responses to user interactions. The interactive virtual object changes its appearance based on different interaction states, such as hovering, pinching, and dragging. These visual cues provide immediate feedback to users, helping them gauge the effect of their interactions without physical touch.

In some examples, the XR system employs a hover detection mechanism, allowing users to see how their hand movements affect the interface before actually interacting with it. This feature helps users understand the boundaries and limits of interactive elements in the virtual environment, reducing confusion and improving usability.

In some examples, to mitigate the challenges posed by hand tracking limitations, the XR system implements anti-jitter or smoothing techniques. These methods help filter out unintended movements caused by hand tremors or tracking inaccuracies, allowing for more precise control of the slider.

This approach significantly improves the user's ability to make fine adjustments to controls in free space.

In some examples, the XR system also supports both near-field and far-field interactions. Users can directly manipulate the slider when it's within reach or use a cursor for interactions at a distance. This flexibility accommodates various user preferences and physical limitations, enhancing the overall usability of the interface.

In some examples, by combining these features, the XR system creates a more intuitive, precise, and user-friendly interface for manipulating controls in extended reality environments, effectively addressing the challenges of translating traditional UI elements to 3D spaces and compensating for the limitations of hand tracking technology.

In some examples, the XR system generates an interactive XR user interface that includes an interactive virtual object. The XR system renders the interactive virtual object using a first set of attributes and displays it to a user as a component of the XR user interface. The XR system detects a hover event of the user holding a hand in proximity to the interactive virtual object. In response to detecting the hover event, the XR system renders the interactive virtual object using a set of attributes and re-displays the interactive virtual object to the user.

In some examples, the XR system detects a pinch gesture of the hand in proximity to the interactive virtual object. In response to detecting the pinch gesture, the XR system renders the interactive virtual object using a set of attributes. The XR system then re-displays the interactive virtual object to the user.

In some examples, the XR system detects a movement of the hand as the hand holds the pinch gesture. In response to detecting the movement of the hand, the XR system renders the interactive virtual object using a set of attributes. The XR system then re-displays the interactive virtual object to the user.

In some examples, the XR system detects a release of the pinch gesture by the hand. In response to detecting the release of the pinch gesture by the hand, the XR system renders the interactive virtual object using a set of attributes. The XR system then re-displays the interactive virtual object to the user. Finally, the XR system determines a user interface interaction based on an amount of the movement of the hand.

Other technical features can be readily apparent to one skilled in the art from the following figures, descriptions, and claims.

FIG. 1A is a perspective view of a head-wearable apparatus 100 according to some examples. The head-wearable apparatus 100 can be a client device of an XR system, such as a user system 302 of FIG. 3. The head-wearable apparatus 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the head-wearable apparatus 100.

The frame 102 additionally includes a left arm or left temple piece 122 and a right arm or right temple piece 124. In some examples the frame 102 can be formed from a single piece of material so as to have a unitary or integral construction.

The head-wearable apparatus 100 can include a computing device, such as a computer 120, which can be of any suitable type so as to be carried by the frame 102 and, in one or more examples, of a suitable size and shape, so as to be partially disposed in one of the left temple piece 122 or the right temple piece 124. The computer 120 can include one or more processors with memory, wireless communication circuitry, and a power source. As discussed below, the computer 120 comprises low-power circuitry 224, high-speed circuitry 226, and a display processor. Various other examples can include these elements in different configurations or integrated together in different ways. Additional details of aspects of the computer 120 can be implemented as illustrated by the machine 500 discussed herein.

The computer 120 additionally includes a battery 118 or other suitable portable power supply. In some examples, the battery 118 is disposed in left temple piece 122 and is electrically coupled to the computer 120 disposed in the right temple piece 124. The head-wearable apparatus 100 can include a connector or port (not shown) suitable for charging the battery 118, a wireless receiver, transmitter or transceiver (not shown), or a combination of such devices.

The head-wearable apparatus 100 includes a first or left camera 114 and a second or right camera 116. Although two cameras are depicted, other examples contemplate the use of a single or additional (i.e., more than two) cameras.

In some examples, the head-wearable apparatus 100 includes any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide tracking image data for use by the head-wearable apparatus 100 to extract 3D information from a real-world scene.

The head-wearable apparatus 100 can also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input can be provided by one or more buttons 128, which in the illustrated examples are provided on the outer upper edges of the left optical element holder 104 and right optical element holder 106. The one or more touchpads 126 and buttons 128 provide a means whereby the head-wearable apparatus 100 can receive input from a user of the head-wearable apparatus 100.

Figure 1B:
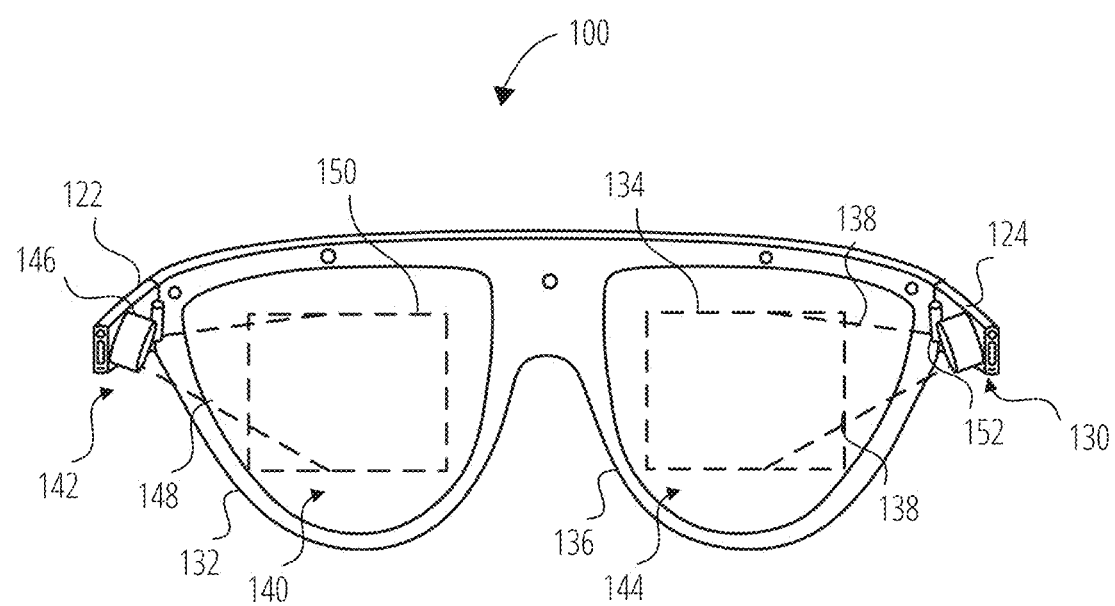
FIG. 1B illustrates a further view of the head-wearable apparatus of FIG. 1A, according to some examples.

FIG. 1B illustrates the head-wearable apparatus 100 from the perspective of a user while wearing the head-wearable apparatus 100. For clarity, a number of the elements shown in FIG. 1A have been omitted. As described in FIG. 1A, the head-wearable apparatus 100 shown in FIG. 1B includes left optical element 140 and right optical element 144 secured within the left optical element holder 132 and the right optical element holder 136 respectively.

The head-wearable apparatus 100 includes right forward optical assembly 130 comprising a left near eye display 150, a right near eye display 134, and a left forward optical assembly 142 including a left projector 146 and a right projector 152.

In some examples, the near eye displays are waveguides. The waveguides include reflective or diffractive structures (e.g., gratings and/or optical elements such as mirrors, lenses, or prisms). Light 138 emitted by the right projector 152 encounters the diffractive structures of the waveguide of the right near eye display 134, which directs the light towards the right eye of a user to provide an image on or in the right optical element 144 that overlays the view of the real-world scene seen by the user. Similarly, light 148 emitted by the left projector 146 encounters the diffractive structures of the waveguide of the left near eye display 150, which directs the light towards the left eye of a user to provide an image on or in the left optical element 140 that overlays the view of the real-world scene seen by the user. The combination of a Graphical Processing Unit, an image display driver, the right forward optical assembly 130, the left forward optical assembly 142, left optical element 140, and the right optical element 144 provide an optical engine of the head-wearable apparatus 100. The head-wearable apparatus 100 uses the optical engine to generate an overlay of the real-world scene view of the user including display of a user interface to the user of the head-wearable apparatus 100.

It will be appreciated however that other display technologies or configurations can be utilized within an optical engine to display an image to a user in the user's field of view. For example, instead of a projector and a waveguide, an LCD, LED or other display panel or surface can be provided.

In use, a user of the head-wearable apparatus 100 will be presented with information, content and various user interfaces on the near eye displays. As described in more detail herein, the user can then interact with the head-wearable apparatus 100 using a touchpad 126 and/or the button 128, voice inputs or touch inputs on an associated device (e.g. mobile device 240 illustrated in FIG. 2), and/or hand movements, locations, and positions recognized by the head-wearable apparatus 100.

In some examples, an optical engine of an XR system is incorporated into a lens that is in contact with a user's eye, such as a contact lens or the like. The XR system generates images of an XR experience using the contact lens.

In some examples, the head-wearable apparatus 100 comprises an XR system. In some examples, the head-wearable apparatus 100 is a component of an XR system including additional computational components. In some examples, the head-wearable apparatus 100 is a component in an XR system comprising additional user input systems or devices.

Figure 2:
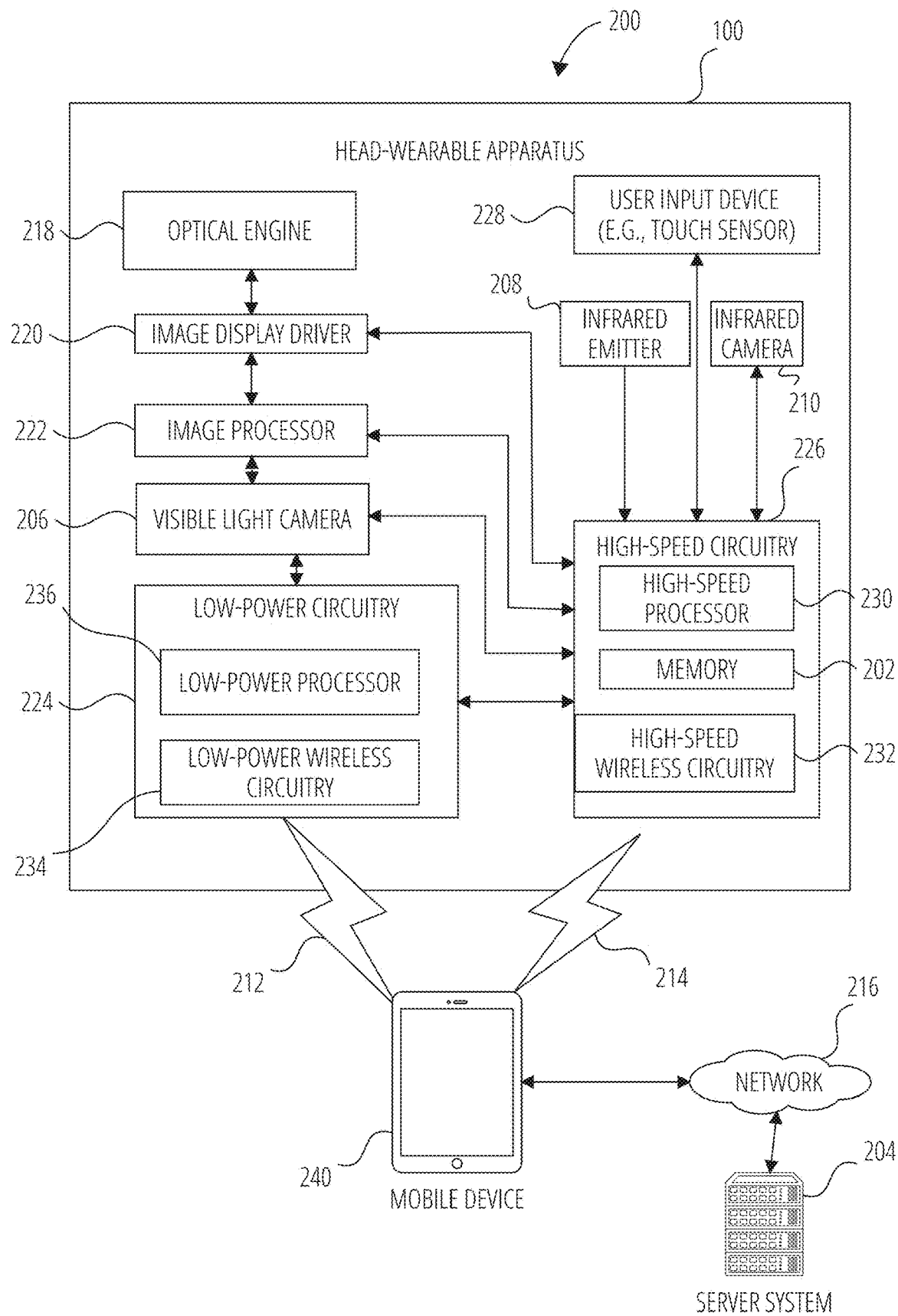
FIG. 2 illustrates a system in which the head-wearable apparatus is operably connected to a mobile device, according to some examples.

FIG. 2 illustrates a system 200 including a head-wearable apparatus 100 with a selector input device, according to some examples. FIG. 2 is a high-level functional block diagram of an example head-wearable apparatus 100 communicatively coupled to a mobile device 240 and various server systems 204 via various.

The head-wearable apparatus 100 includes one or more cameras, each of which can be, for example, a visible light camera 206, an infrared emitter 208, and an infrared camera 210.

The mobile device 240 connects with head-wearable apparatus 100 using both a low-power wireless connection 212 and a high-speed wireless connection 214. The mobile device 240 is also connected to the server system 204 and the networks 216.

The head-wearable apparatus 100 further includes one or more image displays of the optical engine 218. The optical engines 218 include one associated with the left lateral side and one associated with the right lateral side of the head-wearable apparatus 100. The head-wearable apparatus 100 also includes an image display driver 220, an image processor 222, low-power circuitry 224, and high-speed circuitry 226. The optical engine 218 is for presenting images and videos, including an image that can include a graphical user interface to a user of the head-wearable apparatus 100.

The image display driver 220 commands and controls the optical engine 218. The image display driver 220 can deliver image data directly to the optical engine 218 for presentation or can convert the image data into a signal or data format suitable for delivery to the image display device. For example, the image data can be video data formatted according to compression formats, such as H.264 (MPEG-4 Part 10), HEVC, Theora, Dirac, RealVideo RV40, VP8, VP9, or the like, and still image data can be formatted according to compression formats such as Portable Network Group (PNG), Joint Photographic Experts Group (JPEG), Tagged Image File Format (TIFF) or exchangeable image file format (EXIF) or the like.

The head-wearable apparatus 100 includes a frame and stems (or temples) extending from a lateral side of the frame. The head-wearable apparatus 100 further includes a user input device 228 (e.g., touch sensor or push button), including an input surface on the head-wearable apparatus 100. The user input device 228 (e.g., touch sensor or push button) is to receive from the user an input selection to manipulate the graphical user interface of the presented image.

The components shown in FIG. 2 for the head-wearable apparatus 100 are located on one or more circuit boards, for example a PCB or flexible PCB, in the rims or temples. Alternatively, or additionally, the depicted components can be located in the chunks, frames, hinges, or bridge of the head-wearable apparatus 100. Left and right visible light cameras 206 can include digital camera elements such as a complementary metal oxide-semiconductor (CMOS) image sensor, charge-coupled device, camera lenses, or any other respective visible or light-capturing elements that can be used to capture data, including images of scenes with unknown objects.

The head-wearable apparatus 100 includes a memory 202, which stores instructions to perform a subset, or all the functions described herein. The memory 202 can also include storage device.

As shown in FIG. 2, the high-speed circuitry 226 includes a high-speed processor 230, a memory 202, and high-speed wireless circuitry 232. In some examples, the image display driver 220 is coupled to the high-speed circuitry 226 and operated by the high-speed processor 230 to drive the left and right image displays of the optical engine 218. The high-speed processor 230 can be any processor capable of managing high-speed communications and operation of any general computing system needed for the head-wearable apparatus 100. The high-speed processor 230 includes processing resources needed for managing high-speed data transfers on a high-speed wireless connection 214 to a wireless local area network (WLAN) using the high-speed wireless circuitry 232. In certain examples, the high-speed processor 230 executes an operating system such as a LINUX operating system or other such operating system of the head-wearable apparatus 100, and the operating system is stored in the memory 202 for execution. In addition to any other responsibilities, the high-speed processor 230 executing a software architecture for the head-wearable apparatus 100 is used to manage data transfers with high-speed wireless circuitry 232. In certain examples, the high-speed wireless circuitry 232 is configured to implement Institute of Electrical and Electronic Engineers (IEEE) 802.11 communication standards, also referred to herein as WI-FI®. In some examples, other high-speed communications standards can be implemented by the high-speed wireless circuitry 232.

The low-power wireless circuitry 234 and the high-speed wireless circuitry 232 of the head-wearable apparatus 100 can include short-range transceivers (e.g., Bluetooth™ Bluetooth LE, Zigbee, ANT+) and wireless wide, local, or wide area Network transceivers (e.g., cellular or WI-FI®). Mobile device 240, including the transceivers communicating via the low-power wireless connection 212 and the high-speed wireless connection 214, can be implemented using details of the architecture of the head-wearable apparatus 100, as can other elements of the network 216.

The memory 202 includes any storage device capable of storing various data and applications, including, among other things, camera data generated by the left and right visible light cameras 206, the infrared camera 210, and the image processor 222, as well as images generated for display by the image display driver 220 on the image displays of the optical engine 218. While the memory 202 is shown as integrated with high-speed circuitry 226, in some examples, the memory 202 can be an independent standalone element of the head-wearable apparatus 100. In certain such examples, electrical routing lines can provide a connection through a chip that includes the high-speed processor 230 from the image processor 222 or the low-power processor 236 to the memory 202. In some examples, the high-speed processor 230 can manage addressing of the memory 202 such that the low-power processor 236 will boot the high-speed processor 230 any time that a read or write operation involving memory 202 is needed.

As shown in FIG. 2, the low-power processor 236 or high-speed processor 230 of the head-wearable apparatus 100 can be coupled to the camera (visible light camera 206, infrared emitter 208, or infrared camera 210), the image display driver 220, the user input device 228 (e.g., touch sensor or push button), and the memory 202.

The head-wearable apparatus 100 is connected to a host computer. For example, the head-wearable apparatus 100 is paired with the mobile device 240 via the high-speed wireless connection 214 or connected to the server system 204 via the network 216. The server system 204 can be one or more computing devices as part of a service or network computing system, for example, that includes a processor, a memory, and network communication interface to communicate over the network 216 with the mobile device 240 and the head-wearable apparatus 100.

The mobile device 240 includes a processor and a Network communication interface coupled to the processor. The Network communication interface allows for communication over the network 216, low-power wireless connection 212, or high-speed wireless connection 214. The mobile device 240 can further store at least portions of the instructions in the memory of the mobile device 240 memory to implement the functionality described herein.

Output components of the mobile device 240 include visual components, such as a display such as a liquid crystal display (LCD), a plasma display panel (PDP), a light-emitting diode (LED) display, a projector, or a waveguide. The image displays of the optical assembly are driven by the image display driver 220. The output components of the mobile device 240 further include acoustic components (e.g., speakers), haptic components (e.g., a vibratory motor), other signal generators, and so forth. The input components of the mobile device 240, the mobile device 240, and server system 204, such as the user input device 228, can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 100 can also include additional peripheral device elements. Such peripheral device elements can include sensors and display elements integrated with the head-wearable apparatus 100. For example, peripheral device elements can include any I/O components including output components, motion components, position components, or any other such elements described herein.

In some examples, the head-wearable apparatus 100 can include biometric components or sensors to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components can include a brain-machine interface (BMI) system that allows communication between the brain and an external device or machine. This can be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored with only user approval and deleted on user request, and in accordance with applicable laws. Further, such biometric data can be used for very limited purposes, such as identification verification. To ensure limited and authorized use of biometric information and other personally identifiable information (PII), access to this data is restricted to authorized personnel only, if at all. Any use of biometric data can strictly be limited to identification verification purposes, and the biometric data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude can be derived), orientation sensor components (e.g., magnetometers), and the like. Such positioning system coordinates can also be received over low-power wireless connections 212 and high-speed wireless connection 214 from the mobile device 240 via the low-power wireless circuitry 234 or high-speed wireless circuitry 232.

Figure 3:
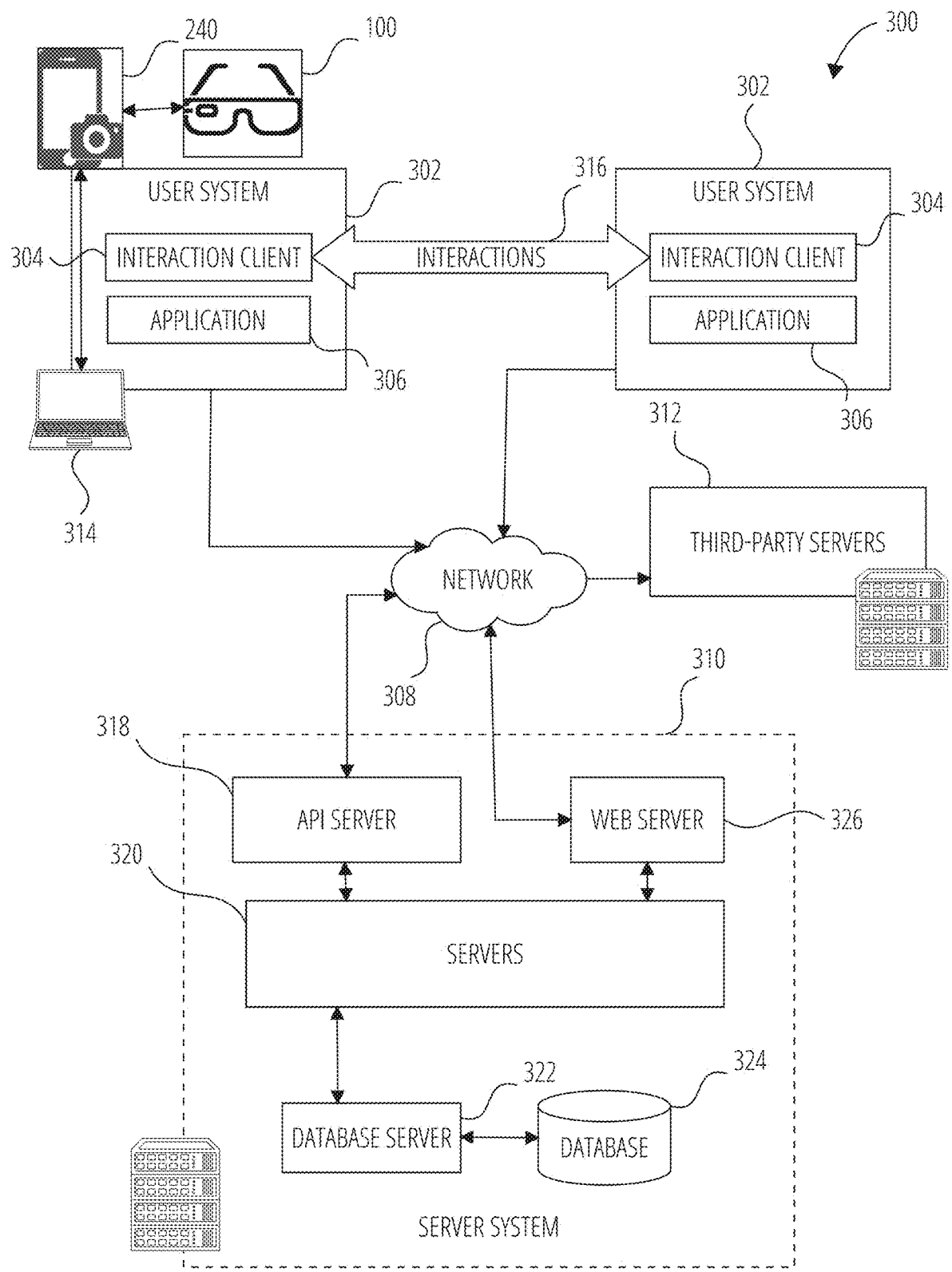
FIG. 3 illustrates a networked environment, according to some examples.

FIG. 3 is a block diagram showing an example digital interaction system 300 for facilitating interactions and engagements (e.g., exchanging text messages, conducting text audio and video calls, or playing games) over a network. The digital interaction system 300 includes multiple user systems 302, each of which hosts multiple applications, including an interaction client 304 and other applications 306. Each interaction client 304 is communicatively coupled, via one or more networks including a network 308 (e.g., the Internet), to other instances of the interaction client 304 (e.g., hosted on respective other user systems), a server system 310 and third-party servers 312). An interaction client 304 can also communicate with locally hosted applications 306 using Applications Program Interfaces (APIs).

Each user system 302 can include multiple user devices, such as a mobile device 240, head-wearable apparatus 100, and a computer client device 314 that are communicatively connected to exchange data and messages.

An interaction client 304 interacts with other interaction clients 304 and with the server system 310 via the network 308. The data exchanged between the interaction clients 304 (e.g., interactions 316) and between the interaction clients 304 and the server system 310 includes functions (e.g., commands to invoke functions) and payload data (e.g., text, audio, video, or other multimedia data).

The server system 310 provides server-side functionality via the network 308 to the interaction clients 304. While certain functions of the digital interaction system 300 are described herein as being performed by either an interaction client 304 or by the server system 310, the location of certain functionality either within the interaction client 304 or the server system 310 can be a design choice. For example, it can be technically preferable to initially deploy particular technology and functionality within the server system 310 but to later migrate this technology and functionality to the interaction client 304 where a user system 302 has sufficient processing capacity.

The server system 310 supports various services and operations that are provided to the interaction clients 304. Such operations include transmitting data to, receiving data from, and processing data generated by the interaction clients 304. This data can include message content, client device information, geolocation information, digital effects (e.g., media augmentation and overlays), message content persistence conditions, entity relationship information, and live event information. Data exchanges within the digital interaction system 300 are invoked and controlled through functions available via user interfaces (UIs) of the interaction clients 304.

Turning now specifically to the server system 310, an Application Program Interface (API) server 318 is coupled to and provides programmatic interfaces to servers 320, making the functions of the servers 320 accessible to interaction clients 304, other applications 306 and third-party server 312. The servers 320 are communicatively coupled to a database server 322, facilitating access to a database 324 that stores data associated with interactions processed by the servers 320. Similarly, a web server 326 is coupled to the servers 320 and provides web-based interfaces to the servers 320. To this end, the web server 326 processes incoming network requests over the Hypertext Transfer Protocol (HTTP) and several other related protocols.

The Application Program Interface (API) server 318 receives and transmits interaction data (e.g., commands and message payloads) between the servers 320 and the user systems 302 (and, for example, interaction clients 304 and other application 306) and the third-party server 312. Specifically, the Application Program Interface (API) server 318 provides a set of interfaces (e.g., routines and protocols) that can be called or queried by the interaction client 304 and other applications 306 to invoke functionality of the servers 320. The Application Program Interface (API) server 318 exposes various functions supported by the servers 320, including account registration; login functionality; the sending of interaction data, via the servers 320, from a particular interaction client 304 to another interaction client 304; the communication of media files (e.g., images or video) from an interaction client 304 to the servers 320; the settings of a collection of media data (e.g., a narrative); the retrieval of a list of friends of a user of a user system 302; the retrieval of messages and content; the addition and deletion of entities (e.g., friends) to an entity relationship graph; the location of friends within an entity relationship graph; and opening an application event (e.g., relating to the interaction client 304).

The interaction client 304 provides a user interface that allows users to access features and functions of an external resource, such as a linked application 306, an applet, or a microservice. This external resource can be provided by a third party or by the creator of the interaction client 304.

The external resource can be a full-scale application installed on the user's system 302, or a smaller, lightweight version of the application, such as an applet or a microservice, hosted either on the user's system or remotely, such as on third-party servers 312 or in the cloud. These smaller versions, which include a subset of the full application's features, can be implemented using a markup-language document and can also incorporate a scripting language and a style sheet.

When a user selects an option to launch or access the external resource, the interaction client 304 determines whether the resource is web-based or a locally installed application. Locally installed applications can be launched independently of the interaction client 304, while applets and microservices can be launched or accessed via the interaction client 304.

If the external resource is a locally installed application, the interaction client 304 instructs the user's system to launch the resource by executing locally stored code. If the resource is web-based, the interaction client 304 communicates with third-party servers to obtain a markup-language document corresponding to the selected resource, which it then processes to present the resource within its user interface.

The interaction client 304 can also notify users of activity in one or more external resources. For instance, it can provide notifications relating to the use of an external resource by one or more members of a user group. Users can be invited to join an active external resource or to launch a recently used but currently inactive resource.

The interaction client 304 can present a list of available external resources to a user, allowing them to launch or access a given resource. This list can be presented in a context-sensitive menu, with icons representing different applications, applets, or microservices varying based on how the menu is launched by the user.

Figure 4:
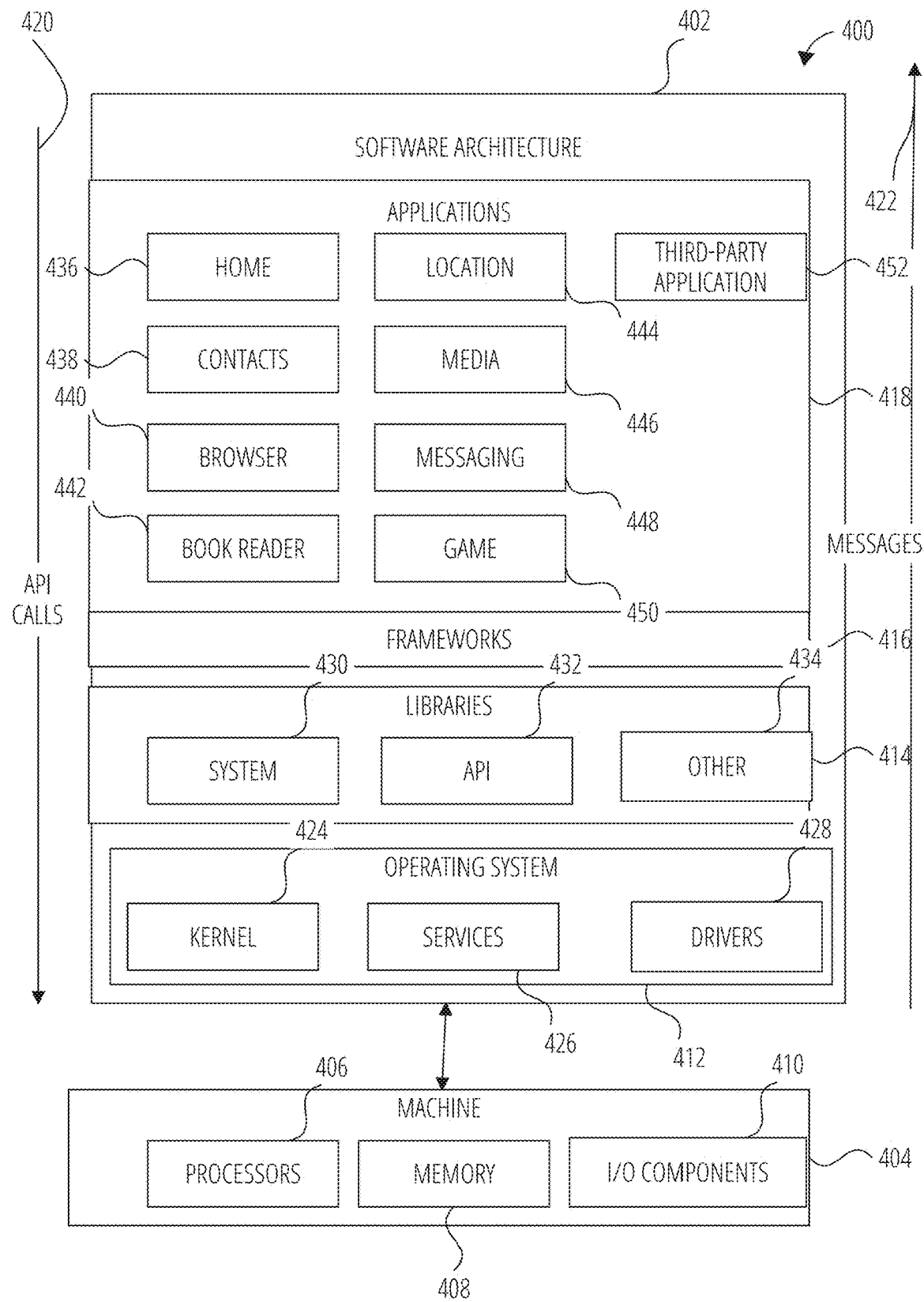
FIG. 4 is a block diagram showing a software architecture, according to some examples.

FIG. 4 is a block diagram 400 illustrating a software architecture 402, which can be installed on any one or more of the devices described herein. The software architecture 402 is supported by hardware such as a machine 404 that includes processors 406, memory 408, and I/O components 410. In this example, the software architecture 402 can be conceptualized as a stack of layers, where each layer provides a particular functionality. The software architecture 402 includes layers such as an operating system 412, libraries 414, frameworks 416, and applications 418. Operationally, the applications 418 invoke API calls 420 through the software stack and receive messages 422 in response to the API calls 420.

The operating system 412 manages hardware resources and provides common services. The operating system 412 includes, for example, a kernel 424, services 426, and drivers 428. The kernel 424 acts as an abstraction layer between the hardware and the other software layers. For example, the kernel 424 provides memory management, processor management (e.g., scheduling), component management, networking, and security settings, among other functionalities. The services 426 can provide other common services for the other software layers. The drivers 428 are responsible for controlling or interfacing with the underlying hardware. For instance, the drivers 428 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 414 provide a common low-level infrastructure used by the applications 418. The libraries 414 can include system libraries 430 (e.g., C standard library) that provide functions such as memory allocation functions, string manipulation functions, mathematical functions, and the like. In addition, the libraries 414 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 414 can also include a wide variety of other libraries 434 to provide many other APIs to the applications 418.

The frameworks 416 provide a common high-level infrastructure that is used by the applications 418. For example, the frameworks 416 provide various graphical user interface (GUI) functions, high-level resource management, and high-level location services. The frameworks 416 can provide a broad spectrum of other APIs that can be used by the applications 418, some of which can be specific to a particular operating system or platform.

In an example, the applications 418 can include a home application 436, a contacts application 438, a browser application 440, a book reader application 442, a location application 444, a media application 446, a messaging application 448, a game application 450, and a broad assortment of other applications such as a third-party application 452. The applications 418 are programs that execute functions defined in the programs. Various programming languages can be employed to create one or more of the applications 418, structured in a variety of manners, such as object-oriented programming languages (e.g., Objective-C, Java, or C++) or procedural programming languages (e.g., C or assembly language). In a specific example, the third-party application 452 (e.g., an application developed using the ANDROID™ or IOS™ software development kit (SDK) by an entity other than the vendor of a platform) can be mobile software running on a mobile operating system such as IOS™, ANDROID™, WINDOWS® Phone, or another mobile operating system. In this example, the third-party application 452 can invoke the API calls 420 provided by the operating system 412 to facilitate functionalities described herein.

Figure 5:
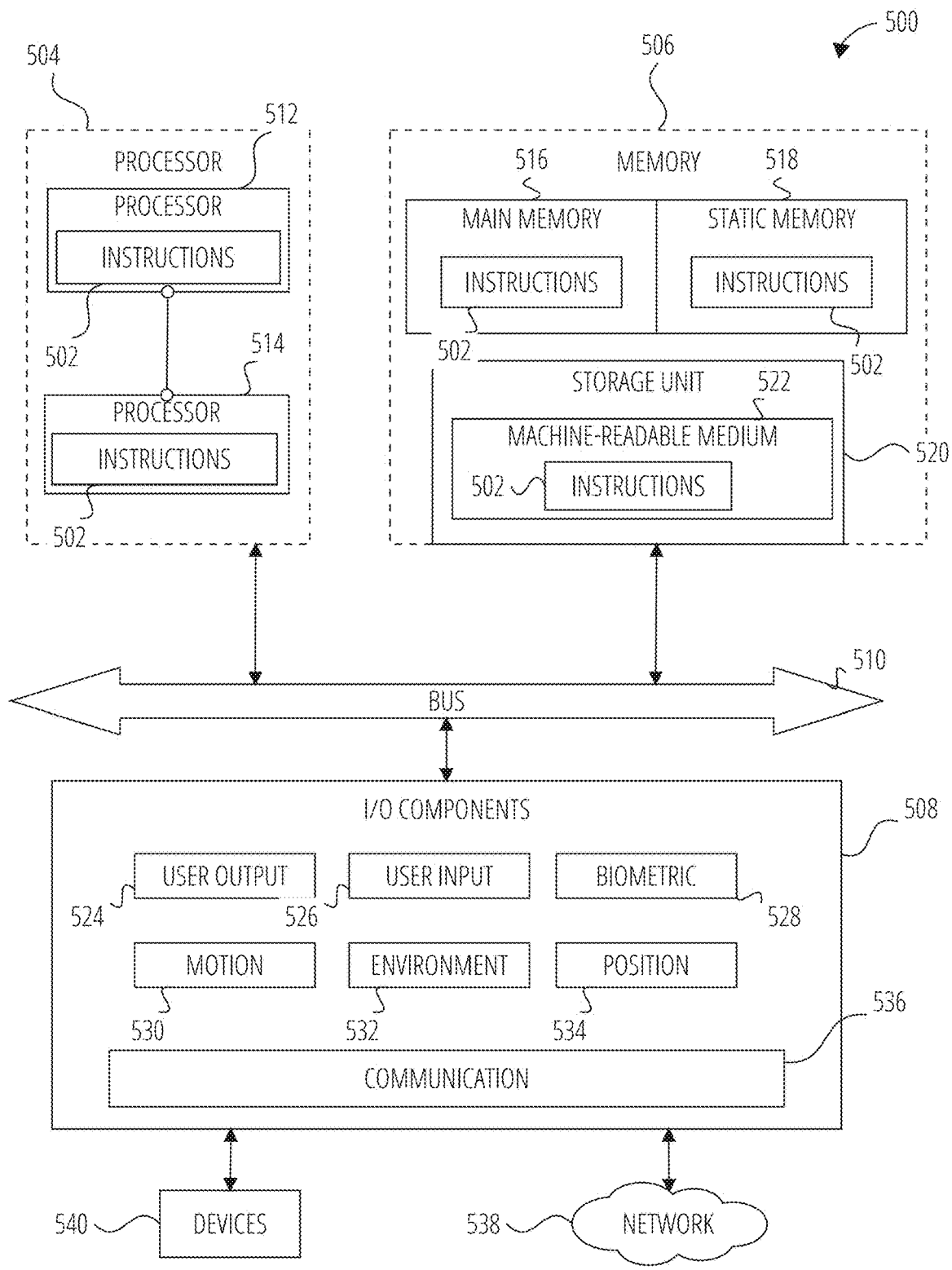
FIG. 5 is a diagrammatic representation of a machine in the form of a computer system, according to some examples.

FIG. 5 is a diagrammatic representation of the machine 500 within which instructions 502 (e.g., software, a program, an application, an applet, an app, or other executable code) for causing the machine 500 to perform any one or more of the methodologies discussed herein can be executed. For example, the instructions 502 can cause the machine 500 to execute any one or more of the methods described herein. The instructions 502 transform the general, non-programmed machine 500 into a particular machine 500 programmed to carry out the described and illustrated functions in the manner described. The machine 500 can operate as a standalone device or can be coupled (e.g., networked) to other machines. In a networked deployment, the machine 500 can operate in the capacity of a server machine or a client machine in a server-client network environment, or as a peer machine in a peer-to-peer (or distributed) network environment. The machine 500 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 502, sequentially or otherwise, that specify actions to be taken by the machine 500. Further, while a single machine 500 is illustrated, the term "machine" shall also be taken to include a collection of machines that individually or jointly execute the instructions 502 to perform any one or more of the methodologies discussed herein. The machine 500, for example, can comprise the user system 302 or any one of multiple server devices forming part of the server system 310. In some examples, the machine 500 can also comprise both client and server systems, with certain operations of a particular method or algorithm being performed on the server-side and with certain operations of the method or algorithm being performed on the client-side.

The machine 500 can include one or more hardware processors 504, memory 506, and input/output I/O components 508, which can be configured to communicate with each other via a bus 510.

The processor 504 can comprise one or more processors such as, but not limited to, processor 512 and processor 514. The one or more processors can comprise one or more types of processing systems such as, but not limited to, Central Processing Units (CPUs), Graphics Processing Units (GPUs), Digital Signal Processors (DSPs), Neural Processing Units (NPUs) or AI Accelerators, Physics Processing Units (PPUs), Field-Programmable Gate Arrays (FPGAs), Multi-core Processors, Symmetric Multiprocessing (SMP) Systems, and the like.

The memory 506 includes a main memory 516, a static memory 518, and a storage unit 520, both accessible to the processor 504 via the bus 510. The main memory 506, the static memory 518, and storage unit 520 store the instructions 502 embodying any one or more of the methodologies or functions described herein. The instructions 502 can also reside, completely or partially, within the main memory 516, within the static memory 518, within machine-readable medium 522 within the storage unit 520, within at least one of the processor 504 (e.g., within the processor's cache memory), or any suitable combination thereof, during execution thereof by the machine 500.

The I/O components 508 can include a wide variety of components to receive input, provide output, produce output, transmit information, exchange information, capture measurements, and so on. The specific I/O components 508 that are included in a particular machine will depend on the type of machine. For example, portable machines such as mobile phones can include a touch input device or other such input mechanisms, while a headless server machine will likely not include such a touch input device. It will be appreciated that the I/O components 508 can include many other components that are not shown in FIG. 5. In various examples, the I/O components 508 can include user output components 524 and user input components 526. The user output components 524 can include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 526 can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 508 can include biometric components 528, motion components 530, environmental components 532, or position components 534, among a wide array of other components. For example, the biometric components 528 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components can include a brain-machine interface (BMI) system that allows communication between the brain and an external device or machine. This can be achieved by recording brain activity data, translating this data into a format that can be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored only with user approval and deleted on user request, and in accordance with applicable laws. Further, such biometric data can be used for very limited purposes, such as identification verification. To ensure limited and authorized use of biometric information and other Personally Identifiable Information (PII), access to this data is restricted to authorized personnel only, if at all. Any use of biometric data can strictly be limited to identification verification purposes, and the data is not shared or sold to any third party without the explicit consent of the user. In addition, appropriate technical and organizational measures are implemented to ensure the security and confidentiality of this sensitive information.

The motion components 530 include acceleration sensor components (e.g., accelerometer), gravitation sensor components, rotation sensor components (e.g., gyroscope).

The environmental components 532 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that can provide indications, measurements, or signals corresponding to a surrounding physical environment.

With respect to cameras, the user system 302 can have a camera system comprising, for example, front cameras on a front surface of the user system 302 and rear cameras on a rear surface of the user system 302. The front cameras can, for example, be used to capture still images and video of a user of the user system 302 (e.g., "selfies"), which can then be modified with digital effect data (e.g., filters) described above. The rear cameras can, for example, be used to capture still images and videos in a more traditional camera mode, with these images similarly being modified with digital effect data. In addition to front and rear cameras, the user system 302 can also include a 360° camera for capturing 360° photographs and videos.

Moreover, the camera system of the user system 302 can be equipped with advanced multi-camera configurations. This can include dual rear cameras, which might consist of a primary camera for general photography and a depth-sensing camera for capturing detailed depth information in a scene. This depth information can be used for various purposes, such as creating a bokeh effect in portrait mode, where the subject is in sharp focus while the background is blurred. In addition to dual camera setups, the user system 302 can also feature triple, quad, or even penta camera configurations on both the front and rear sides of the user system 302. These multiple cameras systems can include a wide camera, an ultra-wide camera, a telephoto camera, a macro camera, and a depth sensor, for example.

Communication can be implemented using a wide variety of technologies. The I/O components 508 further include communication components 536 operable to couple the machine 500 to a Network 538 or devices 540 via respective coupling or connections. For example, the communication components 536 can include a network interface component or another suitable device to interface with the Network 538. In further examples, the communication components 536 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 540 can be another machine or any of a wide variety of peripheral devices (e.g., a peripheral device coupled via a USB).

Moreover, the communication components 536 can detect identifiers or include components operable to detect identifiers. For example, the communication components 536 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™ MaxiCode, PDF417, Ultra Code, UCC RSS-2D bar code, and other optical codes), or acoustic detection components (e.g., microphones to identify tagged audio signals). In addition, a variety of information can be derived via the communication components 536, such as location via Internet Protocol (IP) geolocation, location via Wi-Fi® signal triangulation, location via detecting an NFC beacon signal that can indicate a particular location, and so forth.

The various memories (e.g., main memory 516, static memory 518, and memory of the processor 504) and storage unit 520 can store one or more sets of instructions and data structures (e.g., software) embodying or used by any one or more of the methodologies or functions described herein. These instructions (e.g., the instructions 502), when executed by processor 504, cause various operations to implement the disclosed examples.

The instructions 502 can be transmitted or received over the Network 538, using a transmission medium, via a network interface device (e.g., a network interface component included in the communication components 536) and using any one of several well-known transfer protocols (e.g., hypertext transfer protocol (HTTP)). Similarly, the instructions 502 can be transmitted or received using a transmission medium via a coupling (e.g., a peer-to-peer coupling) to the devices 540.

Figure 6:
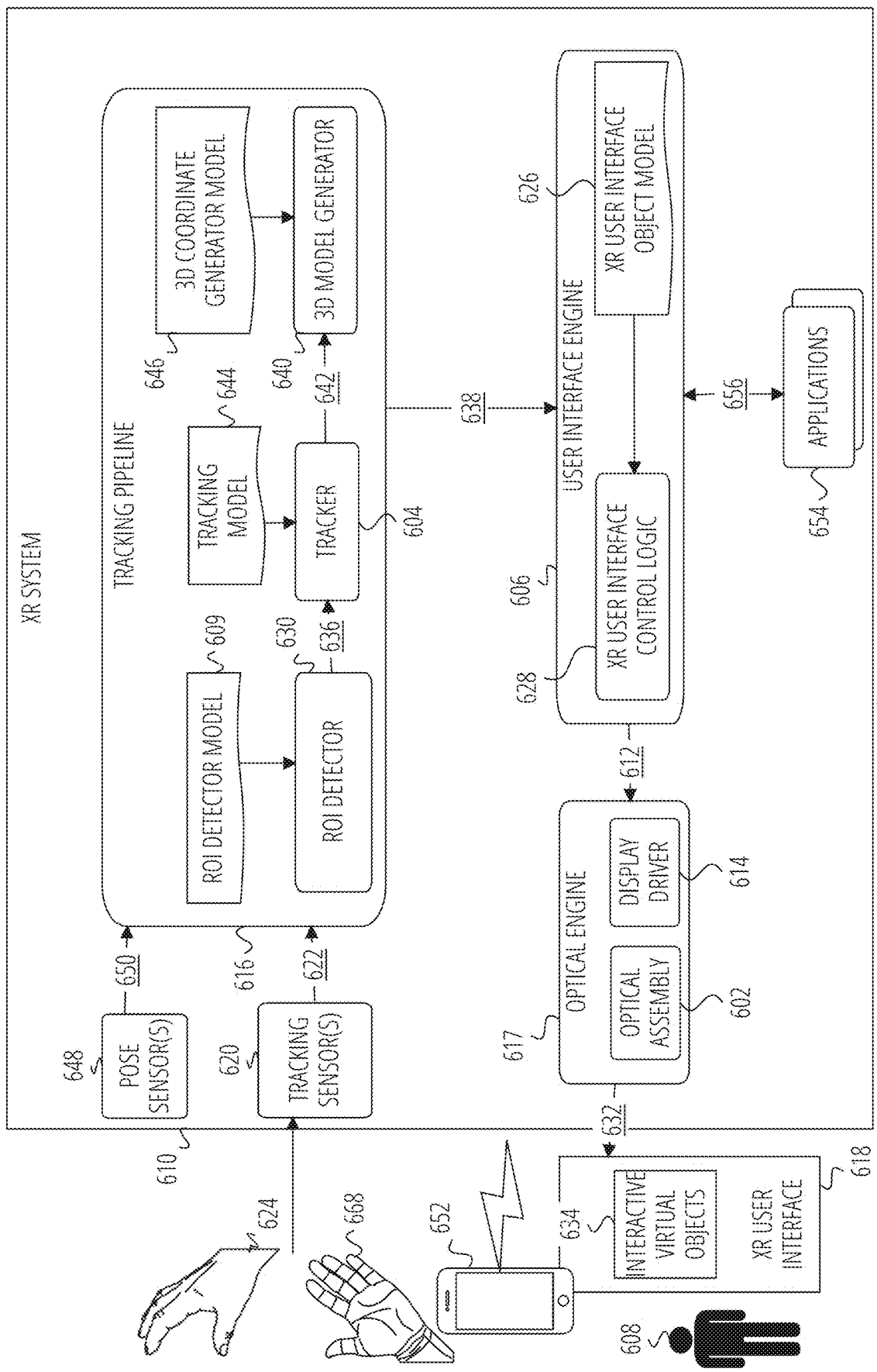
FIG. 6 illustrates a collaboration diagram of components of an XR system, according to some examples.

FIG. 6 illustrates a collaboration diagram of components of an XR system 610, such as head-wearable apparatus 100 of FIG. 1A, using hand-tracking for user input, according to some examples.

The XR system 610 uses 3D tracking data 638 and to provide continuous real-time input modalities to a user 608 of the XR system 610 where the user 608 interacts with one or more XR user interface 618. Using the hand-tracking input modalities, the XR system 610 generates user interface input/output (UI I/O) data 656 that are used by one or more applications 654 to generate one or more one or more interactive virtual objects 634 displayed as part of the one or more XR user interface 618.

The applications 654 are applications that are executed by the XR system 610 and generate application user interfaces that provide features such as, but not limited to, maintenance guides, interactive maps, interactive tour guides, tutorials, and the like. The applications 654 can also be entertainment applications such as, but not limited to, video games, interactive videos, and the like.

The XR system 610 generates the XR user interface 618 provided to the user 608 within an XR environment. The XR user interface 618 include one or more interactive virtual objects 634 that the user 608 can interact with. For example, a user interface engine 606 of FIG. 6 includes XR user interface control logic 628 comprising a dialog script or the like that specifies a user interface dialog implemented by the XR user interface 618. The XR user interface control logic 628 also comprises one or more actions that are to be taken by the XR system 610 based on detecting various dialog events such as user inputs input by the user 608 using the XR user interface 618 and by making hand gestures. The user interface engine 606 further includes an XR user interface object model 626. The XR user interface object model 626 includes 3D coordinate data of the one or more interactive virtual objects 634. The XR user interface object model 626 also includes 3D graphics data of the one or more interactive virtual objects 634. The 3D graphics data is used by an optical engine 617 to generate the XR user interface 618 for display to the user 608.

The user interface engine 606 generates XR user interface data 612 using the XR user interface object model 626. The XR user interface data 612 includes image data of the one or more interactive virtual objects 634 of the XR user interface 618. The user interface engine 606 communicates the XR user interface data 612 to a display driver 614 of an optical engine 617 of the XR system 610. The display driver 614 receives the XR user interface data 612 and generates display control signals using the XR user interface data 612. The display driver 614 uses the display control signals to control the operations of one or more optical assemblies 602 of the optical engine 617. In response to the display control signals, the one or more optical assemblies 602 generate an XR user interface graphics display 632 of the XR user interface 618 that are provided to the user 608.

While in use, the XR system 610 uses one or more tracking sensors 620 to detect and record a position, orientation, and gestures of the hands 624 of the user 608. This can involve capturing the speed and trajectory of hand movements, recognizing specific hand poses, and determining the relative positioning of the hands in the three-dimensional space of an XR environment.

In some examples, the one or more tracking sensors 620 comprise an array of optical sensors capable of capturing a wide range of hand movements and gestures in real-time as images. These sensors can include Red Green and Blue (RGB) cameras that capture images of the hands 624 of the user 608 using light having a broad wavelength spectrum, such as natural light provided by the real-world environment or artificial illumination created by one or more incandescent lamps, LED lamps, or the like provided by the XR system 610. In some examples, the one or more tracking sensors 620 can include infrared cameras that capture images of the hands 624 of the user 608 using energy in the infrared radiation (IR) spectrum. The IR energy can be supplied by one or more IR emitters of the XR system 610.

In some examples, the one or more tracking sensors 620 comprise depth-sensing cameras that utilize structured light or time-of-flight technology to create a three-dimensional model of the hands 624 of the user 608. This allows the XR system 610 to detect intricate gestures and finger movements with high accuracy.

In some examples, the one or more tracking sensors 620 comprise ultrasonic sensors that emit sound waves and measure the reflection off the hands 624 of the user 608 to determine their location and movement in space.

In some examples, the one or more tracking sensors 620 comprise electromagnetic field sensors that track the movement of the hands 624 of the user 608 by detecting changes in an electromagnetic field generated around the user 608.

In some examples, the one or more tracking sensors 620 include capacitive sensors embedded in gloves worn by the user 608. These sensors detect hand movements and gestures based on changes in capacitance caused by finger positioning and orientation.

In some examples, the XR system 610 includes one or more pose sensors 648 such as an Inertial Measurement Unit (IMU) and the like, that track the orientation and movements of the XR system of the user 608. The one or more pose sensors 648 are used to determine Six Degrees of Freedom (6DoF) data of movement of the XR system 610 in three-dimensional space. Specifically, the 6DoF data encompasses three translational movements along the x, y, and z axes (forward/back, up/down, left/right) and three rotational movements (pitch, yaw, roll) included in pose data 650. In the context of XR, 6DoF data is allows for the tracking of both position and orientation of an object or user in 3D space.

In some examples, the one or more pose sensors 648 include one or more cameras that capture images of the real-world environment. The images are included in the pose data 650. The XR system 610 uses the images and photogrammetric methodologies to determine 6DoF data of the XR system 610.

In some examples, the XR system 610 uses a combination of an IMU and one or more cameras to determine 6DoF for the XR system 610.

The XR system 610 uses a tracking pipeline 616 including a Region Of Interest (ROI) detector 630, a tracker 604, and a 3D model generator 640, to generate the 3D tracking data 638 using the tracking data 622 and the pose data 650.

The ROI detector 630 uses a ROI detector model 609 to detect a region in the real world environment that includes a hand 624 of the user 608. The ROI detector model 609 is trained to recognize those portions of the real-world environment that include a user's hands as more fully described in reference to FIG. 11A and FIG. 11B. The ROI detector 630 generates ROI data 636 indicating which portions of the tracking data 622 include one or more hands of the user 608 and communicates the ROI data 636 to the tracker 604.

The tracker 604 uses a tracking model 644 to generate 2D tracking data 642. The tracker 604 uses the tracking model 644 to recognize landmark features at locations on the one or both hands 624 of the user 608 captured in the tracking data 622 and within the ROI identified by the ROI detector 630. The tracker 604 extracts landmarks of the one or both hands 624 of the user 608 from the tracking data 622 using computer vision methodologies including, but not limited to, Harris corner detection, Shi-Tomasi corner detection, Scale-Invariant Feature Transform (SIFT), Speeded-Up Robust Features (SURF), Features from Accelerated Segment Test (FAST), Oriented FAST and Rotated BRIEF (ORB), and the like. The tracking model 644 operates on the landmarks to generate the 2D tracking data 642 that includes a sequence of skeletal models of one or more hands of the user 608. The tracking model 644 is trained to generate the 2D tracking data 642 as more fully described in reference to FIG. 11A and FIG. 11B. The tracker communicates the 2D tracking data 642 to the 3D model generator 640.

The 3D model generator 640 receives the 2D tracking data 642 and generates 3D tracking data 638 using the 2D tracking data 642, the pose data 650, and a 3D coordinate generator model 646. For example, the 3D model generator 640 determines a reference position in the real-world environment for the XR system 610. The 3D model generator 640 uses a 3D coordinate generator model 646 that operates on the 2D tracking data 642 to generate the 3D tracking data 638. The 3D coordinate generator model 646 is trained to generate the 3D tracking data 638 as more fully described in reference to FIG. 11A and FIG. 11B.

In some examples, the tracker 604 generates the 3D tracking data 638 using photogrammetry methodologies to create 3D models of the hands of the user 608 from the 2D tracking data 642 by capturing overlapping pictures of the hands of the user 608 from different angles. In some examples, the 2D tracking data 642 includes multiple images taken from different angles, which are then processed to generate the 3D models that are included in the 3D tracking data 638. In some examples, the XR system 610 uses the pose data 650 captured by one or more pose sensors 648 to determine an angle or position of the XR system 610 as an image is captured of the hands of the user 608.

In some examples, images in the tracking data 622 are processed by an image processor to enhance the images for better clarity and contrast, making it easier for the XR system 610 to extract features from the tracking data 622. In some examples, the image processor uses image enhancement methodologies such as, but not limited to: histogram equalization, which adjusts the contrast of an image by redistributing the intensity values; Gaussian smoothing, which reduces noise and detail by averaging pixel values with a Gaussian kernel; unsharp mask filtering, which enhances edges by subtracting a blurred version of the image from the original; Wiener filtering, which removes noise and deblurs images by accounting for both the degradation function and the statistical properties of noise; Contrast-Limited Adaptive Histogram Equalization (CLAHE), which improves local contrast and enhances the definition of edges in an image; median filtering, which reduces noise by replacing each pixel's value with the median value of the intensities in its neighborhood; point operations, which apply the same transformation to each pixel based on its original value, such as intensity transformations; spatial filtering, which involves convolution of the image with a kernel to achieve effects like blurring or sharpening; and the like.

In some examples, the XR system generates multiple collider objects for an interactive virtual object. Each collider object is assigned a specific radius, which may vary to create different interaction zones around the virtual object. These zones are designed to detect varying degrees of proximity and contact from a digit of the hands 624 and 668 of the user 608. The collider objects on the interactive virtual object are configured with radii that serve specific interaction purposes. Larger radii can be used to detect when the digit is in proximity to the interactive virtual object hovering over the location of the interactive virtual object, triggering a hover event. Smaller, more precisely placed radii can detect direct contact or touch when the digit intersect these smaller collider zones. As the user 608 moves a hand in the physical space, the XR system 610 uses the 3D tracking data 638 to track this movement and translates it into the virtual environment. When the digit enters the radius of a collider on the interactive virtual object, XR system 610 calculates the intersection. If the digit enters a larger radius, a hover event is detected. If the digit intersects with a smaller radius, a touch event is registered.

In some examples, the one or more tracking sensors 620 include one or more visible light cameras such as, but not limited to, RGB cameras, that capture images of the hands 624 and 668 of user 608 included in the tracking data 622.

In some examples, the XR system 610 is operably connected to a mobile device 652. The user 608 can use the mobile device 652 to configure the XR system 610. In some examples, the mobile device 652 functions as an alternative input modality.

In some examples, an XR system performs the functions of the tracking pipeline 616, the user interface engine 606, and the optical engine 617 utilizing various APIs and system libraries.

Figure 7A:
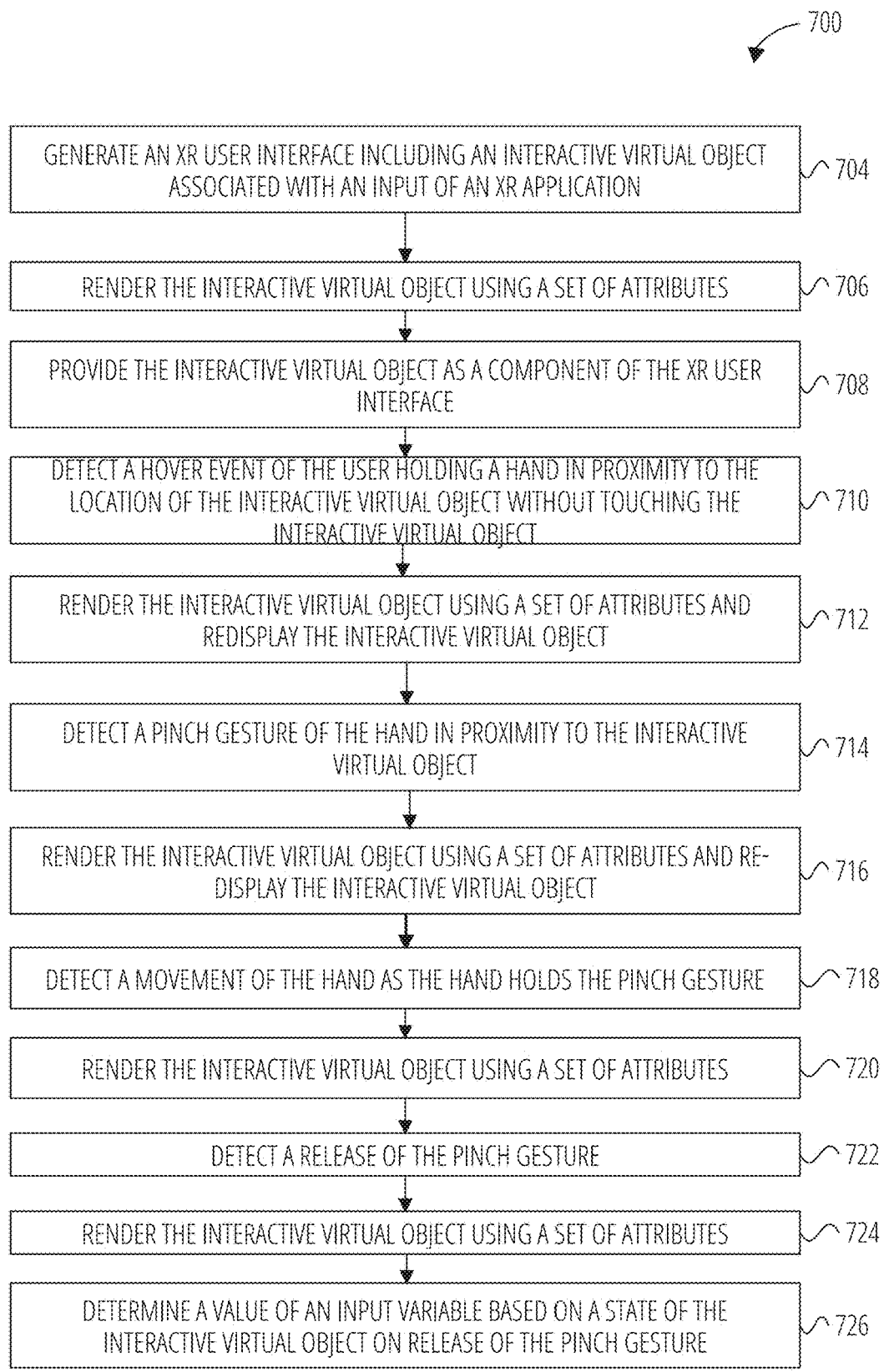
FIG. 7A illustrates an interactive virtual object method, according to some examples.
Figure 7D:
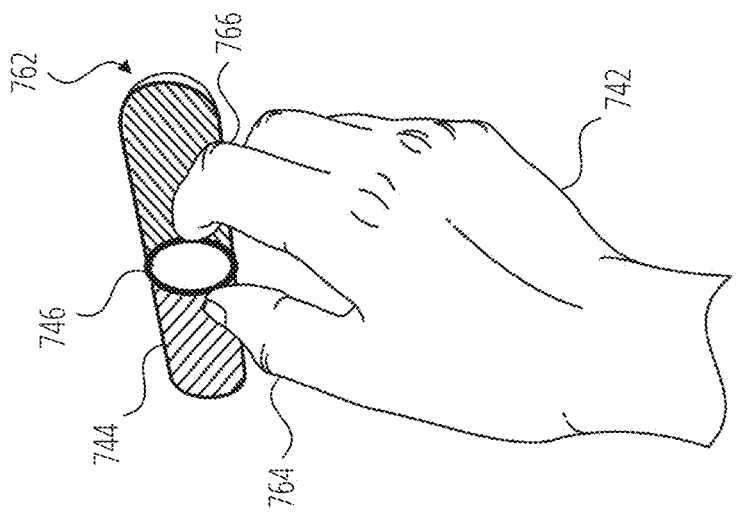
FIG. 7B, FIG. 7C, and FIG. 7D illustrate operation of a 3D slider, according to some examples.
Figure 7C:
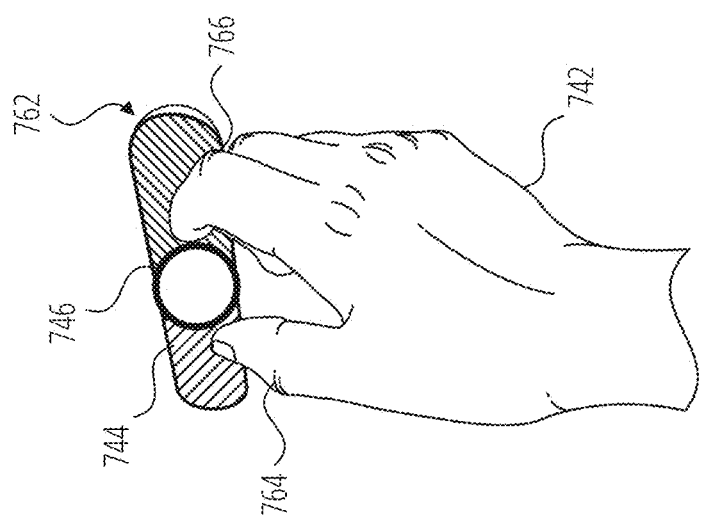
Figure 7B:
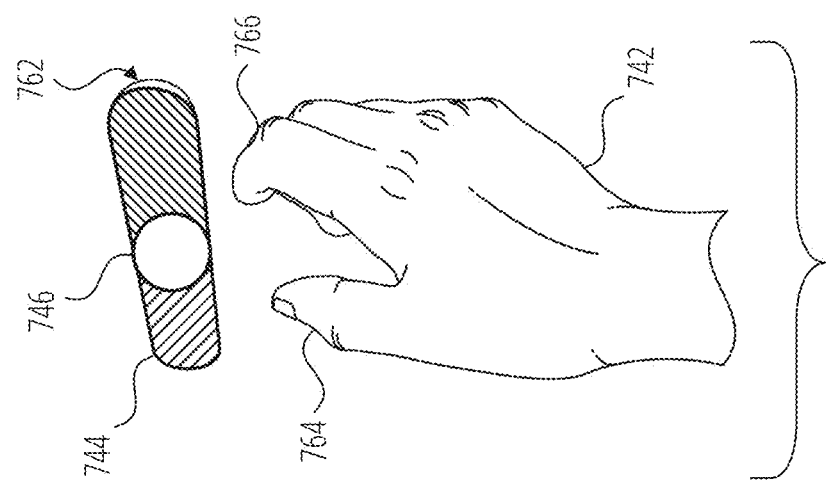
Figure 8:
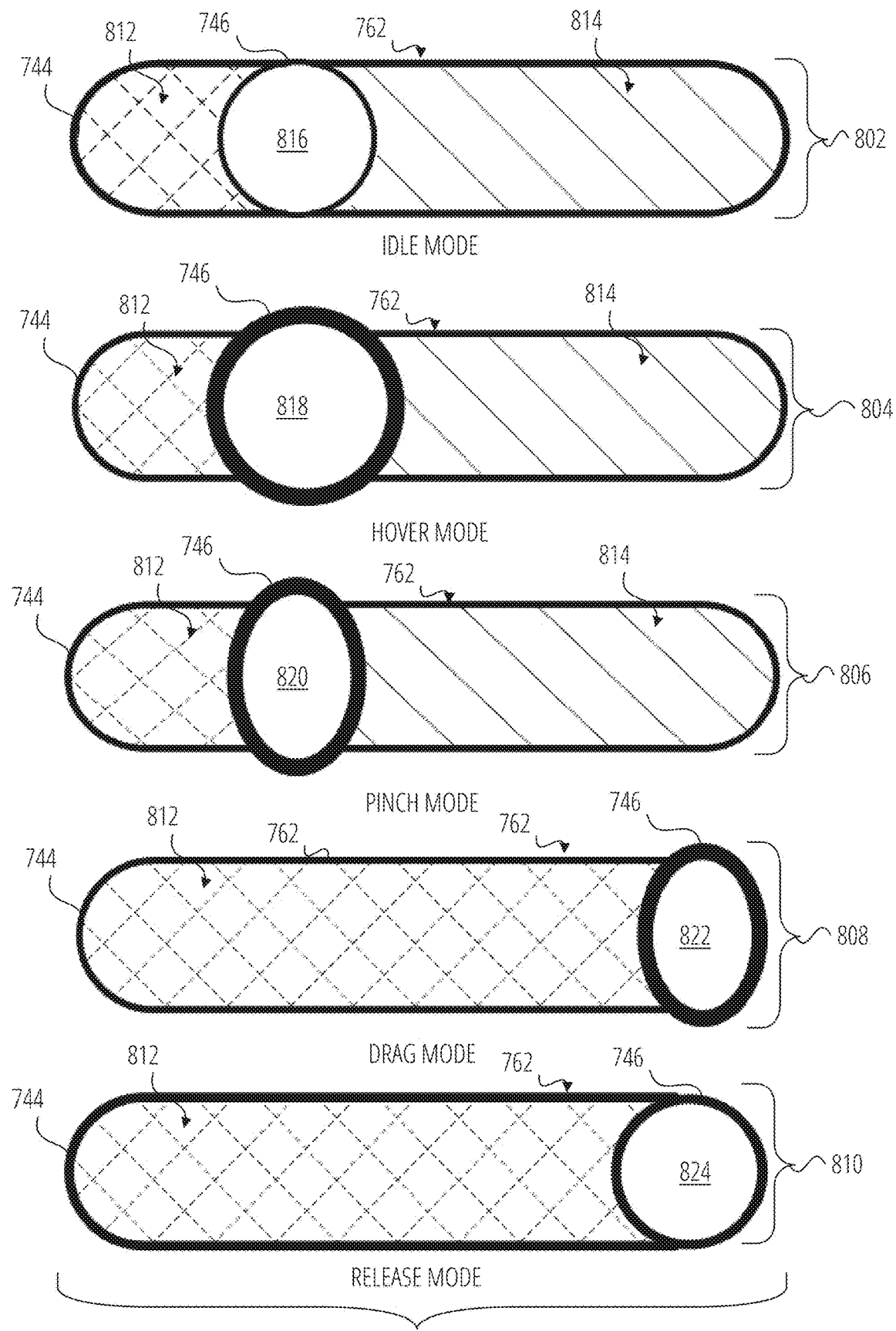
FIG. 8 illustrate renderings of various states or modes of the 3D slider, according to some examples.

FIG. 7A illustrates an example interactive virtual object input method 700, according to some examples. FIG. 7B, FIG. 7C, and FIG. 7D illustrate operation of a 3D slider 762, according to some examples. FIG. 8 illustrate renderings of various states or modes of the 3D slider 762, according to some examples. An XR system, such as XR system 610 of FIG. 6, uses the interactive virtual object input method 700 as a process within an interactive XR user interface. Although the example interactive virtual object input method 700 depicts a particular sequence of operations, the sequence may be altered without departing from the scope of the present disclosure. For example, some of the operations depicted may be performed in parallel or in a different sequence that does not materially affect the function of the interactive virtual object input method 700. In other examples, different components of an XR system that implements the interactive virtual object input method 700 may perform functions at substantially the same time or in a specific sequence.

In operation 704, in reference to FIG. 7B, the XR system generates an XR user interface including an interactive virtual object associated with an input variable or setting of an XR application. For example, the interactive virtual object can be a 3D slider 762 that includes a slider knob 746 and a slider track 744. In some examples, the slider knob 746 is modeled as a 3D spheroid and the slider track 744 is modeled as a 3D groove or trough in which the slider knob 746 is partially embedded.

In some examples, the 3D slider 762 is in a horizontal orientation relative to a frame of reference of the XR system from the viewpoint of the user. In some examples, the 3D slider 762 is in a vertical orientation relative to a frame of reference of the XR system from the viewpoint of the user.

In some examples, the 3D slider 762 is in a horizontal orientation relative to a frame of reference of the real-world environment from the viewpoint of the user. In some examples, the 3D slider 762 is in a vertical orientation relative to a frame of reference of the real-world environment from the viewpoint of the user.

The 3D slider 762 provides a Direct Manipulation Virtual Object (DMVO) user input modality for a user interacting with an XR system. In some examples, a DMVO user input modality provides an intuitive and natural way for users to interact with virtual objects and environments. Visual representation plays a role, with interactive virtual objects displayed in the user's field of view as if they exist in the real-world environment. These objects have visual attributes such as, but not limited to, shape, color, size, and the like that make them easily recognizable.

In some examples, spatial awareness of the user's location in the real-world environment is used for locating the 3D slider 762 in the real-world environment. An XR system tracks the user's position and orientation in the real-world environment, allowing the 3D slider 762 to maintain a consistent position relative to the user's perspective. 3D tracking data is used to continuously monitor the user's hand and finger movements. This allows users to reach out and interact with the 3D slider 762 as if the 3D slider 762 were a physical object.

In some examples, natural gestures are a component of a DMVO user input modality in an XR environment. Users can employ familiar gestures like pinching, reaching for, grasping, and manipulating interactive virtual objects. For example, a user can pinch the thumb 764 and forefinger 766 of their hand 742 together to grasp the slider knob 746. In response, an XR system can provide immediate feedback as the user interacts with the 3D slider 762, offering instant visual feedback. For example, when a user "pinches" the 3D slider 762, the attributes of the 3D slider 762 can change and the slider knob 746 can appear to move with the user's hand 742.

In some examples, there is a direct correspondence between user actions and the behavior of the 3D slider 762. For example, actions performed by the user can have a 1:1 correspondence with the behavior of the slider knob 746. If a user moves their hand 742 while pinching the slider knob 746, the slider knob 746 moves along the slider track 744.

In some examples, a DMVO XR user interface incorporates multimodal input. While hand gestures are primary, users can often combine them with other input methods for more complex interactions. In some examples, spatial audio may be used to enhance the feeling of directness, with audio sources appearing to emanate from the correct locations in the real-world environment corresponding to the 3D slider 762.

In some examples, physics simulation and seamless transitions enhance the realism and usability of a DMVO user input modality. The 3D slider 762 can behave according to simplified physics rules, allowing users to smoothly switch between different types of interactions, such as moving from manipulation of the 3D slider 762 to interface control, without explicitly changing interaction modes.

In some examples, adaptive precision is implemented in a DMVO user input modality. An XR system can assist users in precise manipulations, such as snapping the slider knob 746 to predefined set points, while still maintaining the feeling of direct control. This feature helps to balance natural interaction with the need for accuracy in certain tasks.

In operation 706, the XR system renders the interactive virtual object using a set of attributes. For example, the interactive virtual object can be the 3D slider 762 that the XR system renders using a set of attributes that define the appearance and behavior of the slider track 744 and the slider knob 746. Sets of attributes may be used to generate renderings of the slider track 744 and the slider knob 746 depending on various variables associated with the 3D slider 762 such as, but not limited to, a state of the 3D slider 762, the state of a function or value of a variable of an application associated with an XR user interface including the 3D slider 762, and the like. The attributes can include, but are not limited to, shape, color, shading, texture, lighting, transparency, reflectivity, refractivity, depth, resolution, and anti-aliasing.

In some examples, the XR system generates renderings of the 3D slider 762 using a set of attributes to give the appearance that the slider knob 746 is a spheroid. In some examples, the set of attributes cause the slider knob 746 to be rendered as being translucent. In some examples, the set of attributes cause the slider knob 746 to be rendered as an internally lighted translucent spheroid.

In some examples, the set of attributes cause the slider knob 746 to be rendered to give the appearance that the slider knob 746 is composed of a gelatinous material, such as jelly or the like. For example, the XR system uses soft body physics to simulate the deformation and movement of the slider knob 746. The XR system generates a 3D spheroid mesh as part of the XR user interface object model 626 of FIG. 6 and determines the slider track 744 beneath the 3D spheroid of the slider knob 746 is a groove that accepts a portion of the slider knob 746. The XR system adds soft body physics to the 3D spheroid as an attribute when the 3D spheroid is animated. The XR system generates a soft body simulation for an animation timeline for the 3D spheroid.

When rendering an animation, the XR system adds simulated lights to a scene of the animation to highlight the 3D spheroid's translucency and assigns a translucent material to the 3D spheroid. Various animations can be rendered such as, but not limited to:

Deformation Animation: This animation simulates the slider knob 746 deforming in response to interactions, such as a user's touch. The slider knob 746 can compress, expand, or morph its shape to mimic physical interactions similar to a gelatinous material.

Soft Body Dynamics: This type of animation allows the slider knob 746 to exhibit properties of a soft body, such as jiggling or wobbling, enhancing the realism of the slider knob 746 as it moves or is manipulated.

Hover Animation: When a digit of a hand 742 of the user approaches the slider knob 746, the action can trigger a subtle movement or change in the slider knob 746, such as a slight enlargement or a shimmering effect to indicate it is an interactive object.

The choice of a spheroid shape, combined with its translucent nature and gelatinous consistency, allows for an intuitive and visually appealing interface element that can seamlessly integrate into the virtual or augmented reality scene. This design choice not only aids in maintaining the aesthetic continuity of the virtual environment but also supports user engagement by providing a visually distinct and interactive element that is easy to identify and manipulate within an XR environment.

In some examples, with reference to idle mode 802 of FIG. 8, the 3D slider 762 is rendered using a set of attributes that define the slider knob 746 as a spheroid as illustrated by idle knob rendering 816, and renders the slider track 744 as a 3D groove in which the 816 is partially embedded. The idle knob rendering 816 conveys that the 3D slider 762 is in an idle mode 802 where the 3D slider 762 is available for interaction but has not yet been activated. A first setting indication 812 and a second setting indication 814 illustrate a setting of a variable associated with the 3D slider 762.

In operation 708, the XR system displays the interactive virtual object as a component of the XR user interface. For example, in reference to FIG. 6, a user interface engine 606 generates XR user interface data 612 using an XR user interface object model 626. The XR user interface data 612 includes image data of the one or more interactive virtual objects 634 of the XR user interface 618 including the 3D slider 762. The user interface engine 606 communicates the XR user interface data 612 to a display driver 614 of an optical engine 617 of the XR system 610. The display driver 614 receives the XR user interface data 612 and generates display control signals using the XR user interface data 612. The display driver 614 uses the display control signals to control the operations of one or more optical assemblies 602 of the optical engine 617. In response to the display control signals, the one or more optical assemblies 602 generate an XR user interface graphics display 632 of the XR user interface 618 including the 3D slider 762 provided to the user 608 as more fully described in reference to FIG. 6.

In operation 710, referring to FIG. 7C, the XR system detects a hover event of the user holding their hand 742 in proximity to the location of the interactive virtual object without touching the interactive virtual object. For example, in reference to FIG. 6, the XR system uses the 3D tracking data 638 to determine a location of one or more digits of the hand 742 of the user, such as the thumb 764 and forefinger 766. The XR system determines a distance between the one or more digits of the hand 742 and a location of the interactive virtual object such as the 3D slider 762 using the 3D location of the 3D slider 762 stored in the XR user interface object model 626. When the XR system determines that the distance between the one or more digits and the slider knob 746 exceeds or meets a threshold minimum distance value but does not exceed a maximum distance value, the XR system determines that the user's hand 742 is in proximity or hovering near the slider knob 746 but not touching the slider knob 746 and generates a hover event.

In some examples, the XR system uses colliders to determine when the digits of the user's hand 742 are in proximity to the slider knob 746. For example, the XR system generates a proximity collider object for the slider knob 746 that is stored in the XR user interface object model 626. The proximity collider object encloses the geometry of the slider knob 746. The 3D tracking data 638 can include skeletal node data of the user's hand 742 including node data for the tip of the thumb 764 and the tip of the forefinger 766. When the XR detects an intersection of the skeletal node data of the tip of the thumb 764 and/or the tip of the forefinger 766 with the proximity collider object, the XR system determines that one or more of the digits of the hand 742 of the user are in proximity to the slider knob 746.

In some examples, the XR system uses blend shapes and shaders to control on or more morphing animations and material changes of the slider track 744 and the slider knob 746 when making a transition between a first rendering of a first mode and a second rendering of a subsequent second mode.

In operation 712, in reference to hover mode 804 of FIG. 8, in response to detecting the hover event, the XR system renders the interactive virtual object using a set of attributes and re-displays the interactive virtual object to the user in the XR user interface. For example, the interactive virtual object can be the 3D slider 762 and the XR system renders the 3D slider 762 using a set of attributes that define the slider knob 746 as a spheroid with an internally lighted appearance as illustrated by hover knob rendering 818.

In some examples, in response to detecting the hover event, the XR system uses the hover event as a user input into the XR user interface and to perform a function, action, process, or the like of the application associated with the user input.

In operation 714, in reference to FIG. 7D, the XR system detects a pinch gesture of the hand in proximity to the interactive virtual object. For example, in reference to FIG. 6, the XR system uses the 3D tracking data 638 to determine that a value of a distance between a tip of the thumb 764 of the hand 742 of the user meets or is below a threshold distance value, thus determining that the user is making a pinching gesture with their hand 742.

In some examples, the tracking pipeline 616 uses a hand gesture recognition model to detect the pinch gesture. The training of the hand gesture recognition model is more fully described in reference to FIG. 11A and FIG. 11B. The output of the hand gesture recognition model is included in the 3D tracking data 638 communicated to the user interface engine 606.

In some examples, the XR system uses the 3D tracking data 638 to determine that the thumb 764 and the forefinger 766 are in proximity to the slider knob 746 when the user is making the pinch gesture with their hand 742.

In some examples, the pinch gesture may be made by digits other than the thumb and the forefinger.

In some examples, other gestures may be used by the user to signal an intent to interact with the interactive virtual object such as, but not limited to, a touch and hold gesture, a poking gesture, a grasping gesture with multiple digits or a whole hand, and the like.

In operation 716, in response to detecting the pinch gesture in proximity to the interactive virtual object, the XR system renders the interactive virtual object using a set of attributes and re-displays the interactive virtual object. For example, in reference to pinch mode 806 of FIG. 8, the interactive virtual object is the 3D slider 762 and the XR system uses a set of attributes to render the 3D slider 762 as an oblate spheroid as indicated by pinch knob rendering 820. This indicates that the 3D slider 762 is in a pinch mode 806 and the user can now manipulate the value of an input variable associated with the 3D slider 762 by dragging or moving the slider knob 746 within the slider track 744.

In some examples, when the 3D slider 762 is in a horizontal orientation relative to the reference frame of the XR system from the viewpoint of the user, the axis of the oblate spheroid is in a horizontal orientation relative to the reference frame of the XR system. In some examples, when the 3D slider 762 is in a vertical orientation relative to the reference frame of the XR system from the viewpoint of user, the axis of the oblate spheroid is in a vertical orientation relative to the reference frame of the XR system.

In some examples, when the 3D slider 762 is in a horizontal orientation relative to the reference frame of the real-world environment from the viewpoint of the user, the axis of the oblate spheroid is in a horizontal orientation relative to the reference frame of the real-world environment. In some examples, when the 3D slider 762 is in a vertical orientation relative to the reference frame of the real-world environment from the viewpoint of user, the axis of the oblate spheroid is in a vertical orientation relative to the reference frame of the real-world environment.

In some examples, the axis of the oblate spheroid is aligned with a major axis of the slider track 744. In some examples, the axis of the oblate spheroid is aligned with a minor axis of the slider track 744.

In operation 718, the XR system detects a movement of the hand 742 of the user as the hand 742 holds the pinch gesture. For example, in reference to FIG. 6, the XR system uses the 3D tracking data 638 to determine that the user has moved their hand 742 from a first location where the user first pinched the slider knob 746 to a second location while still holding the pinch gesture.

In operation 720, in response to detecting the movement of the hand 742 as the hand holds the pinch gesture, the XR system renders the interactive virtual object using a set of attributes. For example, in reference to drag mode 808 of FIG. 8, the interactive virtual object can be the 3D slider 762 and the slider knob 746 can be rendered as an oblate spheroid as illustrated by the drag knob rendering 822.

In some examples, the first setting indication 812 and the second setting indication 814 can be rendered to reflect a change in an input variable associated with the 3D slider 762. For example, an area of the first setting indication 812 can be increased and an area of the second setting indication 814 can be decreased proportionally. In some examples, an area of the first setting indication 812 can be decreased and an area of the second setting indication 814 can be increased proportionally.

In some examples, a shading associated with the 3D slider 762 can be changed in proportion to the location of slider knob 746 along the slider track 744. In some examples, an intensity of the shading can be changed. In some examples, an area of the shading can be changed. In some examples, a color of the shading can be changed.

In some examples, a shading of the 3D slider 762 can be changed in proportion to the change in an input value associated with the 3D slider 762. In some examples, an intensity of the shading can be changed. In some examples, an area of the shading can be changed. In some examples, a color of the shading can be changed.

In operation 722, the XR system detects a release of the pinch gesture. For example, in reference to FIG. 6, the XR system uses the 3D tracking data 638 to determine that a value of a distance between a tip of the thumb 764 of the hand 742 of the user meets or exceeds a threshold distance value, thus determining that the user is no longer making a pinching gesture with their hand 742.

In operation 724, in response to the XR system detecting the release of the pinch gesture, the XR system renders the interactive virtual object using a set of attributes. For example, in reference to release mode 810 of FIG. 8, the XR system renders the slider knob 746 of the 3D slider 762 as a 3D spheroid as illustrated by release knob rendering 824.

In operation 726, the XR system determines a value of an input variable based on a state of the interactive virtual object after release of the pinch gesture. For example, the interactive virtual object can be the slider knob 746. During movement of the user's hand 742, the slider knob 746 is slid from a first location on the slider track 744 to a second location in the slider track 744. The value of the input variable associated with the 3D slider 762 can be determined based on the second location of the slider knob 746 within the slider track 744.

Figure 9A:
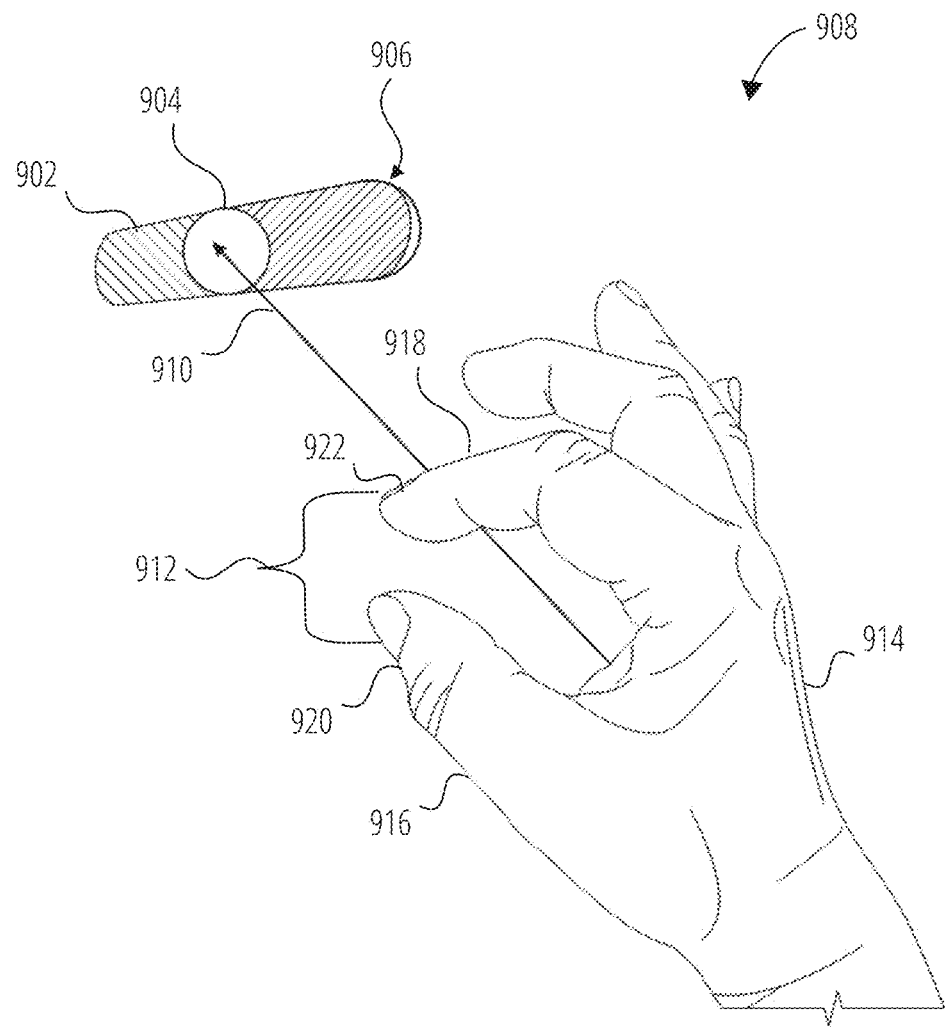
FIG. 9A illustrates a ray casting and pinch selection input modality, according to some examples.

FIG. 9A illustrates a raycast and pinch input modality 908, according to some examples. An XR system 610 of FIG. 6 uses the raycast and pinch input modality 908 to provide an input modality to a user 608 of FIG. 6 while the user 608 interacts with one or more interactive virtual objects 634 of FIG. 6 of the XR user interface 618 of FIG. 6.

The XR system 610 captures tracking data 622 of FIG. 6 using one or more tracking sensors 620 of FIG. 6 and pose data 650 of FIG. 6 using one or more pose sensors 648 of FIG. 6) a hand 914 of the user 608. The XR system 610 generates 3D tracking data 638 of FIG. 6 using a tracking pipeline 616 of FIG. 6 and the pose data 650 and tracking data 622 as further described in reference to FIG. 6. The 3D tracking data 638 includes 3D geometry data of the hand 914 including a 3D location, position, and orientation data.

The XR system provides the raycast and pinch input modality 908 to a user and uses the raycast and pinch input modality 908 to detect when a user interacts with an interactive virtual object such as, but not limited to, a 3D slider 906. The 3D slider 906 includes a slider track 902 and a slider knob 904 that the user can use to set one or more input values into an XR application.

The XR system 610 uses a user interface engine 606 to generate a raycast cursor 910 as a virtual object in the XR user interface object model 626 of FIG. 6. The raycast cursor 910 has an origin point located on the palmar surface of the hand 914. The raycast cursor 910 includes a direction vector orthogonal to the palmar surface and projecting from the origin point.

In some examples, the XR system generates multiple collider objects for an interactive virtual object, such as a slider knob 904 of the 3D slider 906. Each collider object is assigned a specific radius or size, which may vary to create different interaction zones around slider knob 904. These different sized colliders are designed to detect varying degrees of proximity and touch contact by the raycast cursor 910 with the slider knob 904. The collider objects of the slider knob 904 are configured with radii or sizes that serve specific interaction purposes. Larger radii or sizes can be used to detect when the raycast cursor 910 is in proximity to the slider knob 904 hovering near the location of the slider knob 904, triggering a hover event. Smaller, more precisely placed radii or sizes can detect direct contact or a touch event with the slider knob 904 when the raycast cursor 910 intersects these smaller collider objects. As the user moves their hand 914 in physical space, the XR system uses the 3D tracking data to track this movement and translates the movement to the location of the raycast cursor 910 into the virtual environment. When the raycast cursor 910 intersects a collider of the slider knob 904, XR system calculates the location of the intersection. In some examples, if the raycast cursor 910 intersects with one or more of the colliders of the slider knob 904, a hover event is detected. In some examples, if the raycast cursor 910 intersects with one or more of colliders of the slider knob 904 and the user makes a pinch gesture 912, a touch event is registered.

The user positions the raycast cursor 910 by orienting their hand such that the projected raycast cursor 910 intersects with the one or more collider objects of the slider knob 904 displayed within the user's field of view. The XR system 610 continuously updates the position of the raycast cursor 910 based on real-time tracking data of the movement of the hand 914 by the user. As the user maneuvers their hand 914, adjustments are made to the trajectory of the raycast cursor 910 so that the user can point to the slider knob 904. When the XR system detects the raycast cursor 910 intersects with one or more of the one or more colliders of the slider knob 904, the XR system visually indicates the intersection to the user by changes in the appearance of the raycast cursor 910 or the slider knob 904, such as highlighting, size, color change, shape, or the like.

Concurrently, the XR system monitors for specific hand gestures indicative of user input. When the user positions the raycast cursor 910 over the slider knob 904, the user performs a pinch gesture 912, detected by the XR system 610 through analysis of the 3D tracking data. In some examples, the pinch gesture 912 involves the user bringing their thumb 916 and another digit, such as the index finger 918, together while the raycast cursor 910 is intersecting the slider knob 904. In some examples, the XR system 610 detects this gesture by analyzing changes in the distances between the fingertips 920 and 922 of the digits, confirming the gesture when the distance between the fingertips of the digits meet or fall below a proximity threshold value as defined by a sensitivity setting.

In some examples, the pinch gesture may be made by digits other than the thumb and the forefinger.

In some examples, other gestures may be used by the user to signal an intent to interact with the interactive virtual object such as, but not limited to, a touch and hold gesture, a poking gesture, a grasping gesture with multiple digits or a whole hand, and the like.

Upon successful detection of the pinch gesture 912 while the raycast cursor 910 is held on the slider knob 904, the XR system continuously determines if the user is still holding the pinch gesture 912. While the user holds the pinch gesture 912, the XR system uses the tracking data to detect movement of the hand 914 of the user and translates the position of the slider knob 904 in proportion to the movement of the hand 914, allowing the user to move or drag the slider knob 904 back and forth along the slider track 902.

Figure 9B:
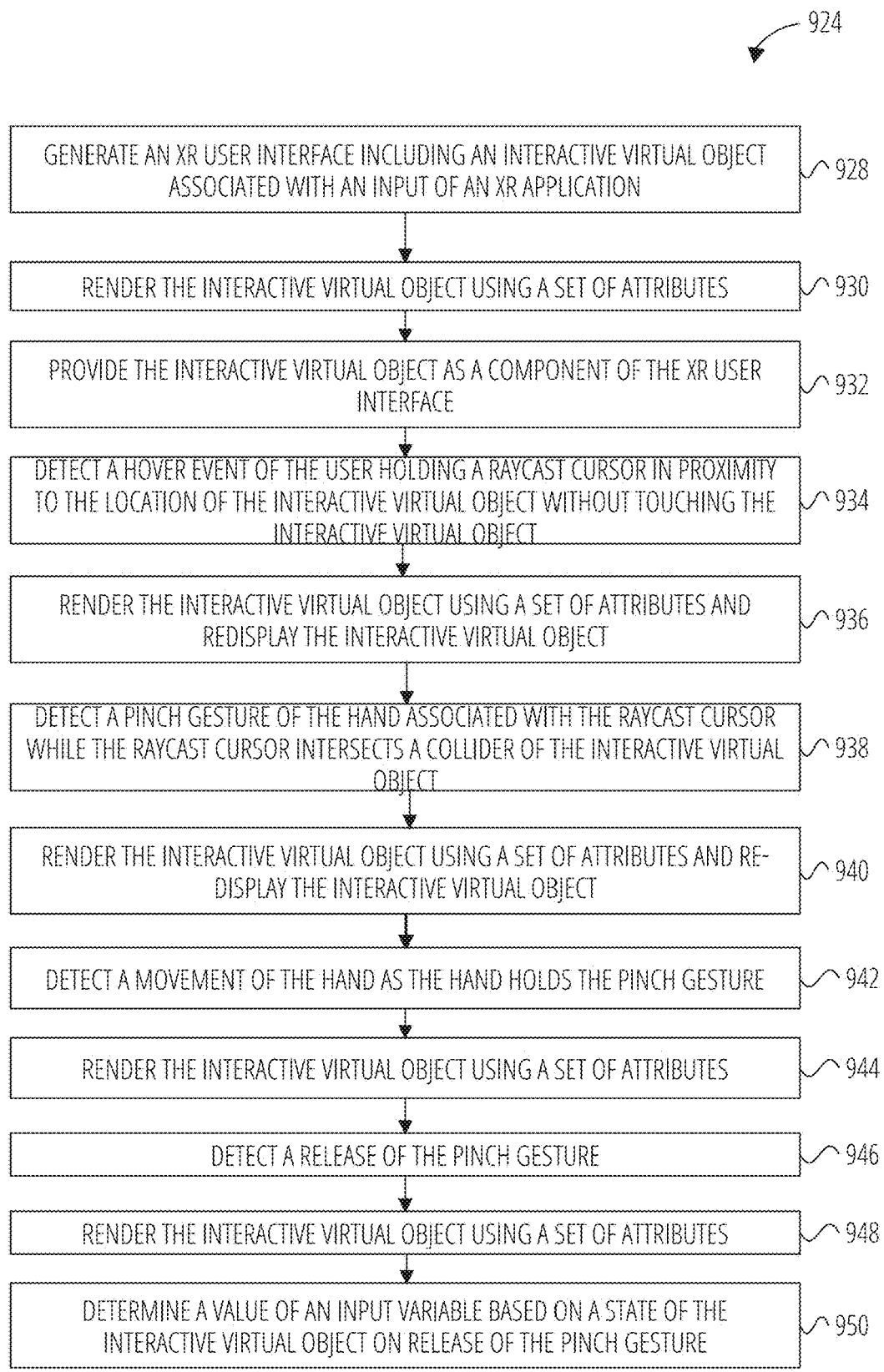
FIG. 9B illustrates an interactive virtual object method, according to some examples.

FIG. 9B illustrates an example raycast and pinch input modality method 924, according to some examples. An XR system, such as XR system 610 of FIG. 6, uses the raycast and pinch input modality method 924 as a process within an interactive XR user interface. Although the example raycast and pinch input modality method 924 depicts a particular sequence of operations, the sequence may be altered without departing from the scope of the present disclosure. For example, some of the operations depicted may be performed in parallel or in a different sequence that does not materially affect the function of the raycast and pinch input modality method 924. In other examples, different components of an XR system that implements the raycast and pinch input modality method 924 may perform functions at substantially the same time or in a specific sequence.

In operation 928, the XR system generates an XR user interface including an interactive virtual object associated with an input variable or setting of an XR application. For example, the interactive virtual object can be the 3D slider 906 that includes the slider knob 904 and the slider track 902.

In some examples, the slider knob 904 is modeled as a 3D spheroid and the slider track 902 is modeled as a 3D groove or trough in which the slider knob 904 is partially embedded.

In some examples, the 3D slider 906 is in a horizontal orientation relative to the viewpoint of the user. In some examples, the 3D slider 906 is in a vertical orientation relative to the viewpoint of the user.

A user uses a raycast cursor 910 to interact with the slider knob 904 as more fully described in reference to FIG. 9A. The 3D slider 906 and raycast cursor 910 provides a raycast and pinch input modality 908 for a user interacting with an XR system.

In some examples, the raycast and pinch input modality 908 incorporates multimodal input. A user uses the raycast cursor 910 to target an interactive virtual object and use a gesture, such as the pinch gesture 912, to indicate a selection of the interactive virtual object. In some examples, users can combine the raycast cursor 910 and the pinch gesture 912 with other input methods for more complex interactions. In some examples, spatial audio may be used to enhance the feeling of directness, with audio sources appearing to emanate from the correct locations in the real-world environment corresponding to the 3D slider 906.

In some examples, the 3D slider 906 can behave according to simplified physics rules, allowing users to smoothly switch between different types of interactions, such as moving from manipulation of the 3D slider 906 to interface control, without explicitly changing interaction modes.

In some examples, adaptive precision is implemented in the raycast and pinch input modality 908. An XR system can assist users in precise manipulations, such as snapping the slider knob 904 to predefined set points, while still maintaining the feeling of direct control. This feature helps to balance natural interaction with the need for accuracy in certain tasks.

In operation 930, the XR system renders the interactive virtual object using a set of attributes. For example, the interactive virtual object can be the 3D slider 906 that the XR system renders using a set of attributes that define the appearance and behavior of the slider track 902 and the slider knob 904. Sets of attributes may be used to generate renderings of the slider track 902 and the slider knob 904 depending on various variables associated with the 3D slider 906 such as, but not limited to, a state of the 3D slider 906, the state of a function or value of a variable of an application associated with an XR user interface including the 3D slider 906, and the like. The attributes can include, but are not limited to, shape, color, shading, texture, lighting, transparency, reflectivity, refractivity, depth, resolution, and anti-aliasing.

In some examples, the XR system generates renderings of the 3D slider 906 using a set of attributes to give the appearance that the slider knob 904 is a spheroid. In some examples, the set of attributes cause the slider knob 904 to be rendered as being translucent. In some examples, the set of attributes cause the slider knob 904 to be rendered as an internally lighted translucent spheroid.

In some examples, the set of attributes cause the slider knob 904 to be rendered to give the appearance that the slider knob 904 is composed of a gelatinous material, such as jelly or the like. For example, the XR system uses soft body physics to simulate the deformation and movement of the slider knob 904. The XR system generates a 3D spheroid mesh as part of the XR user interface object model 626 of FIG. 6 and determines the slider track 902 beneath the 3D spheroid of the slider knob 904 is a groove that accepts a portion of the slider knob 904. The XR system adds soft body physics to the 3D spheroid as an attribute when the 3D spheroid is animated. The XR system generates a soft body simulation for an animation timeline for the 3D spheroid. When rendering an animation, the XR system adds simulated lights to a scene of the animation to highlight the 3D spheroid's translucency and assigns a translucent material to the 3D spheroid. Various animations can be rendered such as, but not limited to, deformation animations, soft body dynamics, hover animations, and the like.

In some examples, with reference to idle mode 802 of FIG. 8, the 3D slider 906 is rendered using a set of attributes that define the slider knob 904 as a spheroid as illustrated by idle knob rendering 816, and renders the slider track 902 as a 3D groove in which the 816 is partially embedded. The idle knob rendering 816 conveys that the 3D slider 906 is in an idle mode 802 where the 3D slider 906 is available for interaction but has not yet been activated. A first setting indication 812 and a second setting indication 814 illustrate a setting of a variable associated with the 3D slider 906.

In operation 932, the XR system displays the interactive virtual object as a component of the XR user interface. For example, in reference to FIG. 6, a user interface engine 606 generates XR user interface data 612 using an XR user interface object model 626. The XR user interface data 612 includes image data of the one or more interactive virtual objects 634 of the XR user interface 618 including the 3D slider 906. The user interface engine 606 communicates the XR user interface data 612 to a display driver 614 of an optical engine 617 of the XR system 610. The display driver 614 receives the XR user interface data 612 and generates display control signals using the XR user interface data 612. The display driver 614 uses the display control signals to control the operations of one or more optical assemblies 602 of the optical engine 617. In response to the display control signals, the one or more optical assemblies 602 generate an XR user interface graphics display 632 of the XR user interface 618 including the 3D slider 906 provided to the user 608 as more fully described in reference to FIG. 6.

In operation 934, the XR system detects a hover event of the user holding the raycast cursor 910 in proximity to the location of the interactive virtual object without touching the interactive virtual object. For example, in reference to FIG. 9A, the interactive virtual object can be the slider knob 904. The XR system uses 3D tracking data and one or more collider objects to detect when the raycast cursor 910 is in proximity to the slider knob 904 as more fully described in reference to FIG. 9A.

In operation 936, in reference to hover mode 804 of FIG. 8, in response to detecting the hover event, the XR system renders the interactive virtual object using a set of attributes and re-displays the interactive virtual object to the user in the XR user interface. For example, the interactive virtual object can be the 3D slider 906 and the XR system renders the 3D slider 906 using a set of attributes that define the slider knob 904 as a spheroid with an internally lighted appearance as illustrated by hover knob rendering 818.

In some examples, in response to detecting the hover event, the XR system uses the hover event as a user input into the XR user interface and to perform a function, action, process, or the like of the application associated with the user input.

In some examples, the XR system uses blend shapes and shaders to control on or more morphing animations and material changes of the slider track 902 and the slider knob 904 when making a transition between a first rendering of a first mode and a second rendering of a subsequent second mode.

In operation 938, the XR system detects a pinch gesture of the hand associated with the raycast cursor while the raycast cursor intersects a collider of the interactive virtual object. For example, in reference to FIG. 9A, the interactive virtual object can be the slider knob 904 and the XR system uses 3D tracking data to determine that the raycast cursor 910 is intersecting one or more colliders of the slider knob 904. Additionally, the XR system uses 3D tracking data to determine value of a distance between a tip of the thumb of the hand 914 of the user meets or is below a threshold distance value, thus determining that the user is making a pinching gesture with their hand 914 as more fully described in reference to FIG. 9A. In some examples, a tracking pipeline of the XR system uses a hand gesture recognition model to detect the pinch gesture. The training of the hand gesture recognition model is more fully described in reference to FIG. 11A and FIG. 11B. The output of the hand gesture recognition model is included in the 3D tracking data.

In operation 940, in response to detecting the pinch gesture while the raycast cursor 910 is intersecting one or more colliders of the interactive virtual object, the XR system renders the interactive virtual object using a set of attributes and re-displays the interactive virtual object. For example, in reference to pinch mode 806 of FIG. 8, the interactive virtual object can be the 3D slider 906 and the XR system uses a set of attributes to render the 3D slider 906 as an oblate spheroid as indicated by pinch knob rendering 820. This indicates that the 3D slider 906 is in a pinch mode 806 and the user can now manipulate the value of an input variable associated with the 3D slider 906 by dragging or moving the slider knob 904 within the slider track 902 as more fully described in reference to FIG. 9A.

In some examples, when the 3D slider 906 is in a horizontal orientation relative to the viewpoint of the user the axis of the oblate spheroid is in a horizontal orientation relative to the user's viewpoint. In some examples, when the 3D slider 906 is in a vertical orientation relative to the viewpoint of the user the axis of the oblate spheroid is in a vertical orientation relative to the user's viewpoint.

In some examples, the axis of the oblate spheroid is aligned with a major axis of the slider track 902. In some examples, the axis of the oblate spheroid is aligned with a minor axis of the slider track 902.

In operation 942, the XR system detects a movement of the hand 914 of the user as the hand thumb 916 holds the pinch gesture. For example, in reference to FIG. 9A, the interactive virtual object can be the slider knob and the XR system uses the 3D tracking data to determine that the user has moved their hand 914 from a first location where the user first held the raycast cursor 910 on the slider knob 904 to a second location while still holding the pinch gesture 912.

In operation 944, in response to detecting the movement of the hand 914 as the hand holds the pinch gesture 912, the XR system renders the interactive virtual object using a set of attributes. For example, in reference to drag mode 808 of FIG. 8, the interactive virtual object can be the 3D slider 906 and the slider knob 904 can be rendered as an oblate spheroid as illustrated by the drag knob rendering 822.

In some examples, the first setting indication 812 and the second setting indication 814 can be rendered to reflect a change in an input variable associated with the 3D slider 906. For example, an area of the first setting indication 812 can be increased and an area of the second setting indication 814 can be decreased proportionally. In some examples, an area of the first setting indication 812 can be decreased and an area of the second setting indication 814 can be increased proportionally.

In some examples, a shading associated with the 3D slider 906 can be changed in proportion to the location of slider knob 904 along the slider track 902. In some examples, an intensity of the shading can be changed. In some examples, an area of the shading can be changed. In some examples, a color of the shading can be changed.

In some examples, a shading of the 3D slider 906 can be changed in proportion to the change in an input value associated with the 3D slider 906. In some examples, an intensity of the shading can be changed. In some examples, an area of the shading can be changed. In some examples, a color of the shading can be changed.

In operation 946, the XR system detects a release of the pinch gesture. For example, in reference to FIG. 9A, the XR system uses the 3D tracking data to determine that a value of a distance between a tip of the thumb 916 of the hand 914 of the user meets or exceeds a threshold distance value, thus determining that the user is no longer making a pinching gesture with their hand 914 as more fully described in FIG. 9A.

In operation 948, in response to the XR system detecting the release of the pinch gesture 912, the XR system renders the interactive virtual object using a set of attributes. For example, in reference to release mode 810 of FIG. 8, the XR system renders the slider knob 904 of the 3D slider 906 as a 3D spheroid as illustrated by release knob rendering 824.

In operation 950, the XR system determines a value of an input variable based on a state of the interactive virtual object after release of the pinch gesture. For example, in references to FIG. 9A, the interactive virtual object can be the slider knob 904. During movement of the user's hand 914, the slider knob 904 is slid from a first location on the slider track 902 to a second location in the slider track 902. The value of the input variable associated with the 3D slider 906 can be determined based on the second location of the slider knob 904 within the slider track 902.

In some examples, movement of a slider knob is constrained. For example, the slider knob can take on discrete values based on a location of the slider knob in a slider track. Accordingly, the value of the input variable associated with the 3D slider can take on discrete values as well.

In some examples, the location of the slider knob can be a continuous value between a minimum and a maximum value. Accordingly, the value of the input variable associated with the 3D slider can take on a continuous value as well.

In some examples, an XR system provides sonic haptic feedback when the user moves a slider knob to an end of a slider track. For example, the XR system detects that the user has moved the slider knob to an end of the slider track using 3D tracking data of the hand of the user and 3D model data of the slider track and the slider knob. The XR system uses the 3D tracking data to determine a current location of the hand. The XR system uses the current location of the hand to determine a current location of the slider knob. The XR system uses the current location of the slider knob along with the 3D model data of the slider track to detect that the slider knob is at an end location of the slider track. The XR system then generates a distinctive sound that indicates to the user that the user has moved the slider knob to an end of the slider track.

In some examples, the XR system uses anti-jitter and/or smoothing techniques to compensate for noise in the 3D tracking data. For example, the methodologies can include:

Low-pass filtering: This technique involves applying a low-pass filter to the 3D tracking data to remove high-frequency jitter. The filter smooths out rapid changes in position while preserving slower, intentional movements. This can be implemented using a simple moving average or more advanced filters like a Kalman filter.

Hysteresis: Implementing a hysteresis threshold for updating a location of a slider knob can help reduce unintended slider value changes due to small hand movements. This involves determining a threshold value of a minimum amount of movement before registering a change in a value of an input variable associated with a 3D slider. For example, the 3D slider might only update its value when the hand movement exceeds a certain distance threshold.

Prediction and interpolation: Using prediction algorithms to estimate the intended hand position based on previous movements can help smooth out the interaction. This can be combined with interpolation between the predicted and actual positions to create a more fluid movement of the 3D slider.

Adaptive smoothing: This method adjusts the amount of smoothing applied based on the speed of hand movement. Faster movements receive less smoothing to maintain responsiveness, while slower movements receive more smoothing to reduce jitter.

Gesture recognition using hand gesture recognition models: Instead of directly mapping hand position to slider value, an XR system can recognize specific gestures (e.g., pinch and drag) and use these to control the 3D slider. This approach can be more robust to small hand tremors or tracking inaccuracies.

Temporal smoothing: This technique involves averaging hand position over a short time window to reduce the impact of momentary tracking errors or hand tremors.

Constraint-based smoothing: By defining constraints on the 3D slider's movement (e.g., limiting the rate of change), an XR system can filter out rapid, unintended movements while still allowing for smooth, intentional interactions.

These techniques can be used individually or in combination to create a smooth and responsive interaction with the 3D slider, mitigating the effects of hand tracking limitations and providing a more stable user experience.

Figure 10A:
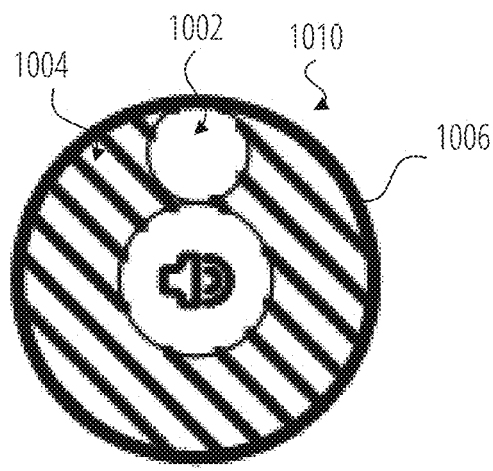
FIG. 10A and FIG. 10B illustrate a 3D curvilinear slider having a curvilinear slider track, according to some examples.
Figure 10B:
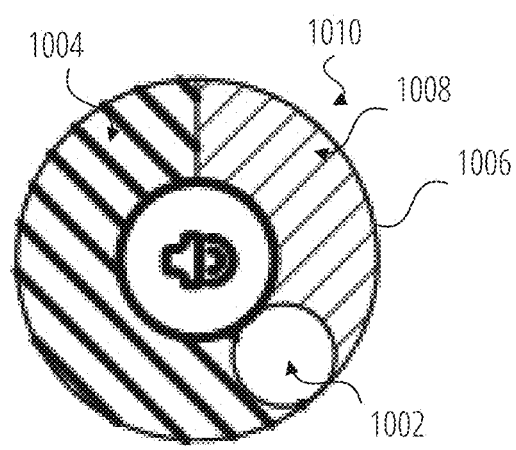

FIG. 10A and FIG. 10B illustrate an interactive virtual object in a form of a 3D curvilinear slider 1010 having a curvilinear slider track 1006, according to some examples. The 3D curvilinear slider 1010 system includes a slider knob 1002, a curvilinear slider track 1006, a first setting indication 1004, and a second setting indication 1008. In some examples, the slider knob 1002 is modeled as a 3D spheroid and the curvilinear slider track 1006 is modeled as a 3D groove or trough in which the slider knob 1002 is partially embedded. An XR system renders the 3D curvilinear slider 1010 using a set of attributes that define the appearance and behavior of the curvilinear slider track 1006 and the slider knob 1002. Sets of attributes may be used to generate renderings of the curvilinear slider track 1006 and the slider knob 1002 depending on various variables associated with the 3D curvilinear slider 1010 as more fully described in reference to FIG. 7A to FIG. 8.

In some examples, the curvilinear slider track 1006 is modeled as a complete circle. In this configuration, a user can move the slider knob 1002 in a complete circle around the curvilinear slider track 1006.

In some examples, the curvilinear slider track 1006 is modeled as an arc having a first end and a second end. In this configuration, the user can move the slider knob 1002 from the first end to the second end.

Machine-Learning Pipeline

Figure 11A:
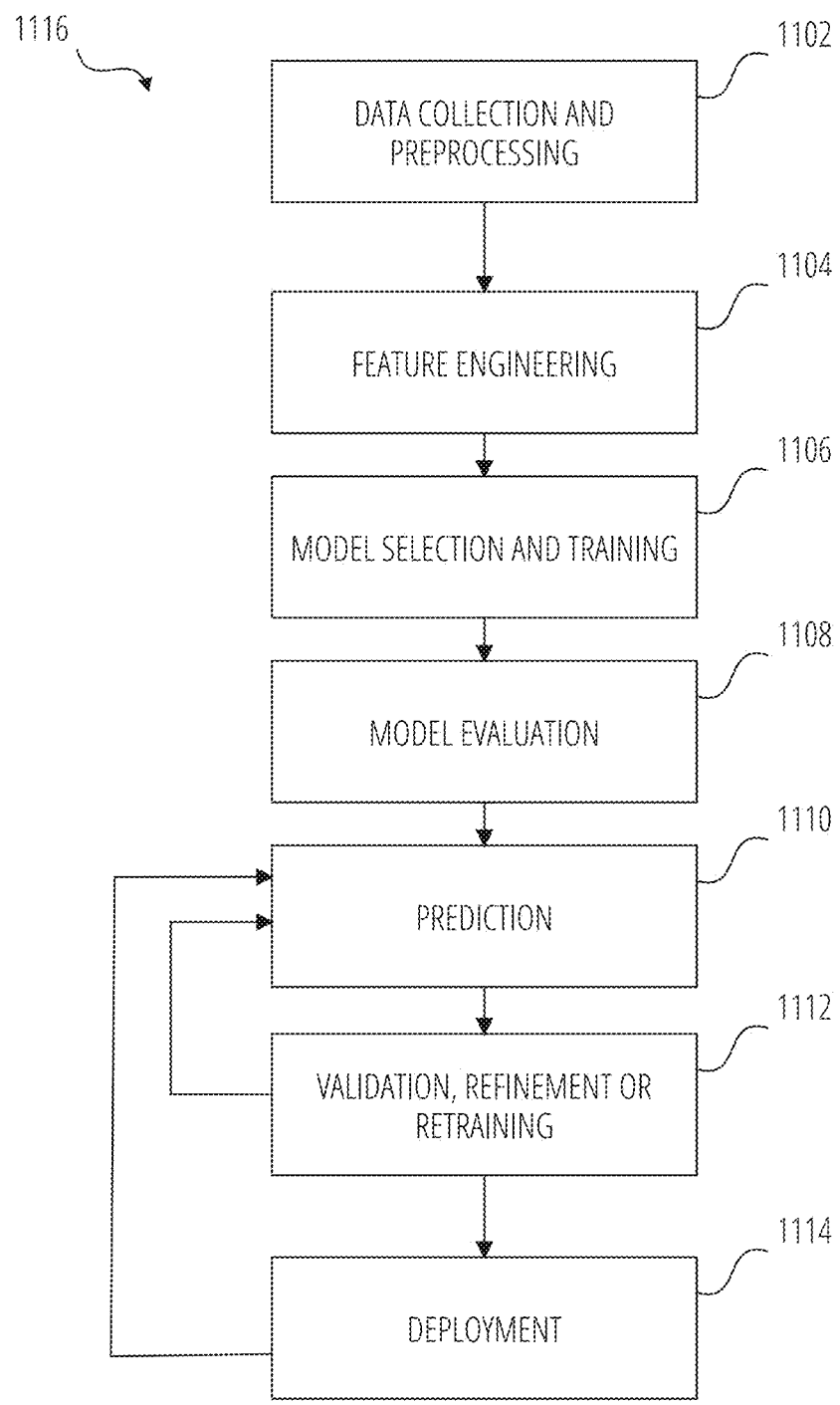
FIG. 11A illustrates a machine-learning pipeline, according to some examples.
Figure 11B:
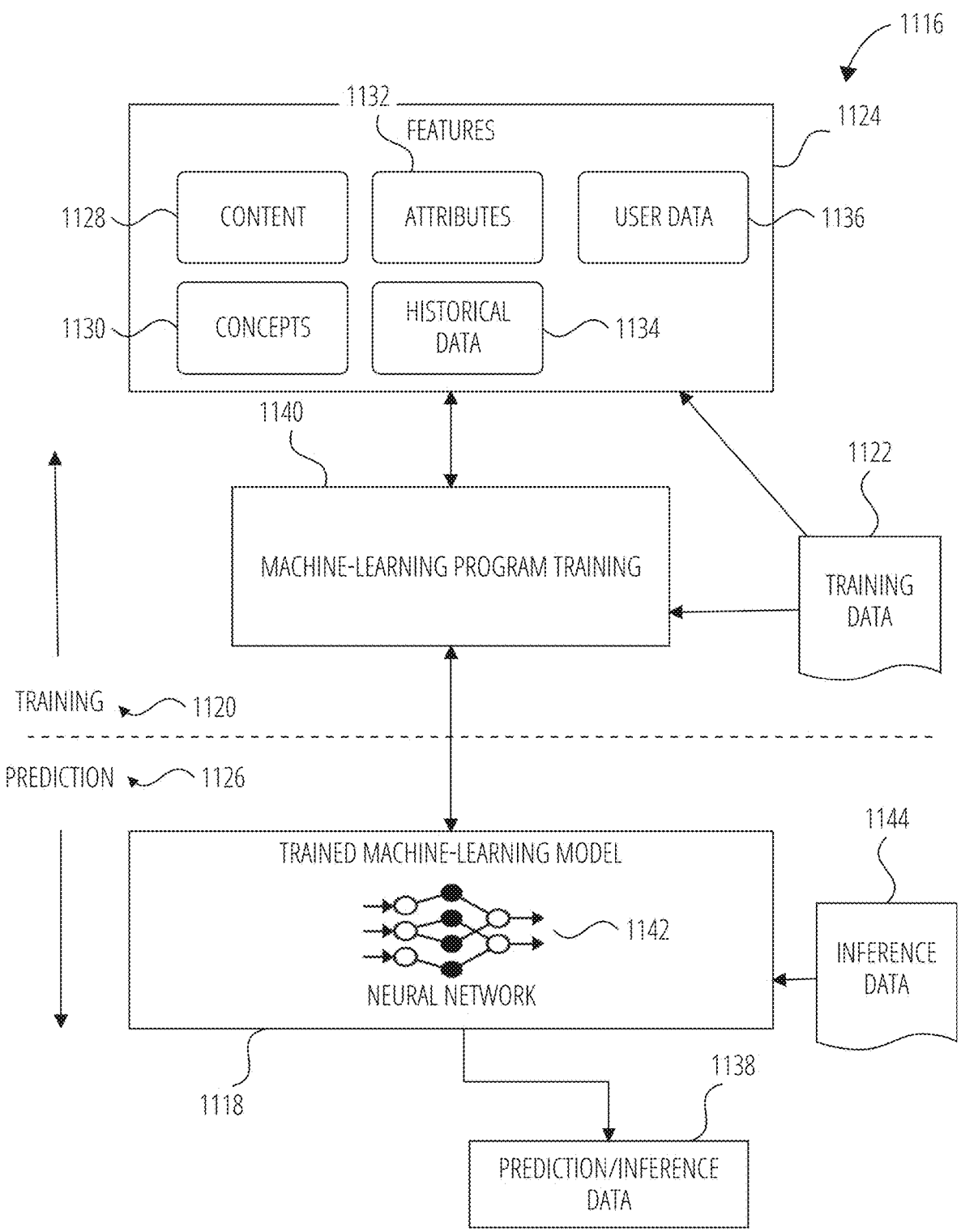
FIG. 11B illustrates training and use of a machine-learning program, according to some examples.

FIG. 11B is a flowchart depicting a machine-learning pipeline 1116, according to some examples. The machine-learning pipeline 1116 can be used to generate a trained machine-learning model 1118 such as, but not limited to a hand gesture recognition model, ROI detector model 609 of FIG. 6, tracking model 644 of FIG. 6, and 3D coordinate generator model 646 of FIG. 6, and the like, to perform operations associated with determining user inputs into an XR system, such as XR system 610 of FIG. 6.

Machine learning can involve using computer algorithms to automatically learn patterns and relationships in data, potentially without the need for explicit programming. Machine learning algorithms can be divided into three main categories: supervised learning, unsupervised learning, and reinforcement learning.

Supervised learning involves training a model using labeled data to predict an output for new, unseen inputs. Examples of supervised learning algorithms include linear regression, decision trees, and neural networks.

Unsupervised learning involves training a model on unlabeled data to find hidden patterns and relationships in the data. Examples of unsupervised learning algorithms include clustering, principal component analysis, and generative models like autoencoders.

Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that can be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting can be used in various machine learning applications.

Three example types of problems in machine learning are classification problems, regression problems, and generation problems. Classification problems, also referred to as categorization problems, aim at classifying items into one of several category values (for example, is this object an apple or an orange?). Regression algorithms aim at quantifying some items (for example, by providing a value that is a real number). Generation algorithms aim at producing new examples that are similar to examples provided for training. For instance, a text generation algorithm is trained on many text documents and is configured to generate new coherent text with similar statistical properties as the training data.

Generating a trained machine-learning model 1118 can include multiple phases that form part of the machine-learning pipeline 1116, including for example the following phases illustrated in FIG. 11A:

Data collection and preprocessing 1102: This phase can include acquiring and cleaning data to ensure that it is suitable for use in the machine learning model. This phase can also include removing duplicates, handling missing values, and converting data into a suitable format.

Feature engineering 1104: This phase can include selecting and transforming the training data 1122 to create features that are useful for predicting the target variable. Feature engineering can include (1) receiving features 1124 (e.g., as structured or labeled data in supervised learning) and/or (2) identifying features 1124 (e.g., unstructured or unlabeled data for unsupervised learning) in training data 1122.

Model selection and training 1106: This phase can include selecting an appropriate machine learning algorithm and training it on the preprocessed data. This phase can further involve splitting the data into training and testing sets, using cross-validation to evaluate the model, and tuning hyperparameters to improve performance.

Model evaluation 1108: This phase can include evaluating the performance of a trained model (e.g., the trained machine-learning model 1118) on a separate testing dataset. This phase can help determine if the model is overfitting or underfitting and determine whether the model is suitable for deployment.

Prediction 1110: This phase involves using a trained model (e.g., trained machine-learning model 1118) to generate predictions on new, unseen data.

Validation, refinement or retraining 1112: This phase can include updating a model based on feedback generated from the prediction phase, such as new data or user feedback.

Deployment 1114: This phase can include integrating the trained model (e.g., the trained machine-learning model 1118) into a more extensive system or application, such as a web service, mobile app, or IoT device. This phase can involve setting up APIs, building a user interface, and ensuring that the model is scalable and can handle large volumes of data.

FIG. 11B illustrates further details of two example phases, namely a training phase 1120 (e.g., part of the model selection and trainings 1106) and a prediction phase 1126 (part of prediction 1110). Prior to the training phase 1120, feature engineering 1104 is used to identify features 1124. This can include identifying informative, discriminating, and independent features for effectively operating the trained machine-learning model 1118 in pattern recognition, classification, and regression. In some examples, the training data 1122 includes labeled data, known for pre-identified features 1124 and one or more outcomes. Each of the features 1124 can be a variable or attribute, such as an individual measurable property of a process, article, system, or phenomenon represented by a data set (e.g., the training data 1122). Features 1124 can also be of different types, such as numeric features, strings, and graphs, and can include one or more of content 1128, concepts 1130, attributes 1132, historical data 1134, and/or user data 1136, merely for example.

In training phase 1120, the machine-learning pipeline 1116 uses the training data 1122 to find correlations among the features 1124 that affect a predicted outcome or prediction/inference data 1138.

With the training data 1122 and the identified features 1124, the trained machine-learning model 1118 is trained during the training phase 1120 during machine-learning program training 1140. The machine-learning program training 1140 appraises values of the features 1124 as they correlate to the training data 1122. The result of the training is the trained machine-learning model 1118 (e.g., a trained or learned model).

Further, the training phase 1120 can involve machine learning, in which the training data 1122 is structured (e.g., labeled during preprocessing operations). The trained machine-learning model 1118 implements a neural network 1142 capable of performing, for example, classification and clustering operations. In other examples, the training phase 1120 can involve deep learning, in which the training data 1122 is unstructured, and the trained machine-learning model 1118 implements a deep neural network 1142 that can perform both feature extraction and classification/clustering operations.

In some examples, a neural network 1142 can be generated during the training phase 1120, and implemented within the trained machine-learning model 1118. The neural network 1142 includes a hierarchical (e.g., layered) organization of neurons, with each layer consisting of multiple neurons or nodes. Neurons in the input layer receive the input data, while neurons in the output layer produce the final output of the network. Between the input and output layers, there can be one or more hidden layers, each consisting of multiple neurons.

Each neuron in the neural network 1142 operationally computes a function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks can use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 1142 can also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 1120, a validation phase can be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model can be tested on a new dataset. The testing dataset is used to evaluate the model's performance and ensure that the model has not overfitted the training data.

In prediction phase 1126, the trained machine-learning model 1118 uses the features 1124 for analyzing inference data 1144 to generate inferences, outcomes, or predictions, as examples of a prediction/inference data 1138. For example, during prediction phase 1126, the trained machine-learning model 1118 generates an output. Inference data 1144 is provided as an input to the trained machine-learning model 1118, and the trained machine-learning model 1118 generates the prediction/inference data 1138 as output, responsive to receipt of the inference data 1144.

In some examples, the trained machine-learning model 1118 can be a generative AI model. Generative AI is a term that can refer to any type of artificial intelligence that can create new content from training data 1122. For example, generative AI can produce text, images, video, audio, code, or synthetic data similar to the original data but not identical. In cases where the trained machine-learning model 1118 is a generative AI, inference data 1144 can include text, audio, image, video, numeric, or media content prompts and the output prediction/inference data 1138 can include text, images, video, audio, code, or synthetic data.

Some of the techniques that can be used in generative AI are:

Convolutional Neural Networks (CNNs): CNNs can be used for image recognition and computer vision tasks. CNNs can, for example, be designed to extract features from images by using filters or kernels that scan the input image and highlight important patterns.

Recurrent Neural Networks (RNNs): RNNs can be used for processing sequential data, such as speech, text, and time series data, for example. RNNs employ feedback loops that allow them to capture temporal dependencies and remember past inputs.

Generative adversarial networks (GANs): GANs can include two neural networks: a generator and a discriminator. The generator network attempts to create realistic content that can "fool" the discriminator network, while the discriminator network attempts to distinguish between real and fake content. The generator and discriminator networks compete with each other and improve over time.

Variational autoencoders (VAEs): VAEs can encode input data into a latent space (e.g., a compressed representation) and then decode it back into output data. The latent space can be manipulated to generate new variations of the output data. VAEs can use self-attention mechanisms to process input data, allowing them to handle long text sequences and capture complex dependencies.

Transformer models: Transformer models can use attention mechanisms to learn the relationships between different parts of input data (such as words or pixels) and generate output data based on these relationships. Transformer models can handle sequential data, such as text or speech, as well as non-sequential data, such as images or code.

Described implementations of the subject matter can include one or more features, alone or in combination as illustrated below by way of example.

Example 1 is a machine-implemented method, comprising: generating an interactive eXtended Reality (XR) user interface of an XR system, the XR user interface including an interactive virtual object; rendering the interactive virtual object using a first set of attributes; displaying the interactive virtual object to a user as a component of the XR user interface; detecting a pinch gesture of the hand in proximity to the interactive virtual object; in response to detecting the pinch gesture, rendering the interactive virtual object using a second set of attributes; and re-displaying the interactive virtual object to the user.

In Example 2, the subject matter of Example 1 includes, wherein the interactive virtual object is a 3D slider including a slider knob and a slider track rendered as three-dimensional objects, wherein the first set of attributes define the slider knob as a spheroid, and wherein the second set of attributes define the slider knob as an oblate spheroid.

In Example 3, the subject matter of any of Examples 1-2 includes, detecting a movement of the hand as the hand holds the pinch gesture; in response to detecting the movement of the hand, rendering the interactive virtual object using a third set of attributes; and re-displaying the interactive virtual object to the user.

In Example 4, the subject matter of any of Examples 1-3 includes, wherein the interactive virtual object is a 3D slider including a slider knob and a slider track rendered as three-dimensional objects, wherein the third set of attributes define the slider knob as an oblate spheroid.

In Example 5, the subject matter of any of Examples 1-4 includes, detecting a release of the pinch gesture by the hand; in response to detecting the release of the pinch gesture by the hand, rendering the interactive virtual object using a fourth set of attributes; re-displaying the interactive virtual object to the user; and determining a user interface interaction based on an amount the movement of the hand.

In Example 6, the subject matter of any of Examples 1-5 includes, wherein the interactive virtual object is a 3D slider including a slider knob and a slider track rendered as three-dimensional objects, wherein the fourth set of attributes define the slider knob as a spheroid.

In Example 7, the subject matter of any of Examples 1-6 includes, wherein the XR system is a head-wearable apparatus.

Example 8 is at least one machine-readable medium including instructions that, when executed by processing circuitry, cause the processing circuitry to perform operations to implement any of Examples 1-7.

Example 9 is an apparatus comprising means to implement any of Examples 1-7.

Example 10 is a system to implement any of Examples 1-7.

Example 11 is a method to implement any of Examples 1-7.

The various features, operations, or processes described herein can be used independently of one another, or can be combined in various ways. All possible combinations and sub-combinations are intended to fall within the scope of this disclosure. In addition, certain method or process blocks can be omitted in some implementations.

Although some examples, e.g., those depicted in the drawings, include a particular sequence of operations, the sequence can be altered without departing from the scope of the present disclosure. For example, some of the operations depicted can be performed in parallel or in a different sequence that does not materially affect the functions as described in the examples. In other examples, different components of an example device or system that implements an example method can perform functions at substantially the same time or in a specific sequence.

Changes and modifications can be made to the disclosed examples without departing from the scope of the present disclosure. These and other changes or modifications are intended to be included within the scope of the present disclosure, as expressed in the appended claims.

TERM EXAMPLES

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to."

As used herein, the terms "connected," "coupled," or any variant thereof means any connection or coupling, either direct or indirect, between two or more elements; the coupling or connection between the elements can be physical, logical, or a combination thereof.

Additionally, the words "herein," "above," "below," and words of similar import, when used in this application, refer to this application as a whole and not to any portions of this application. Where the context permits, words using the singular or plural number can also include the plural or singular number respectively.

The word "or" in reference to a list of two or more items, covers all the following interpretations of the word: any one of the items in the list, all the items in the list, and any combination of the items in the list. Likewise, the term "and/or" in reference to a list of two or more items, covers all the following interpretations of the word: any one of the items in the list, all the items in the list, and any combination of the items in the list.

"Carrier signal" can include, for example, any intangible medium that can store, encoding, or carrying instructions for execution by the machine and includes digital or analog communications signals or other intangible media to facilitate communication of such instructions. Instructions can be transmitted or received over a network using a transmission medium via a network interface device.

"Client device" can include, for example, any machine that interfaces to a network to obtain resources from one or more server systems or other client devices. A client device can be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user can use to access a network.

"Component" can include, for example, a device, physical entity, or logic having boundaries defined by function or subroutine calls, branch points, APIs, or other technologies that provide for the partitioning or modularization of particular processing or control functions. Components can be combined via their interfaces with other components to carry out a machine process. A component can be a packaged functional hardware unit designed for use with other components and a part of a program that usually performs a particular function of related functions. Components can constitute either software components (e.g., code embodied on a machine-readable medium) or hardware components. A "hardware component" is a tangible unit capable of performing certain operations and can be configured or arranged in a certain physical manner. In various examples, one or more computer systems (e.g., a standalone computer system, a client computer system, or a server computer system) or one or more hardware components of a computer system (e.g., a processor or a group of processors) can be configured by software (e.g., an application or application portion) as a hardware component that operates to perform certain operations as described herein. A hardware component can also be implemented mechanically, electronically, or any suitable combination thereof. For example, a hardware component can include dedicated circuitry or logic that is permanently configured to perform certain operations. A hardware component can be a special-purpose processor, such as a field-programmable gate array (FPGA) or an application-specific integrated circuit (ASIC). A hardware component can also include programmable logic or circuitry that is temporarily configured by software to perform certain operations. For example, a hardware component can include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), can be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor can be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In examples in which multiple hardware components are configured or instantiated at different times, communications between such hardware components can be achieved, for example, through the storage and retrieval of information in memory structures to which the multiple hardware components have access. For example, one hardware component can perform an operation and store the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information). The various operations of example methods described herein can be performed, at least partially, by one or more processors that are temporarily configured (e.g., by software) or permanently configured to perform the relevant operations. Whether temporarily or permanently configured, such processors can constitute processor-implemented components that operate to perform one or more operations or functions described herein. As used herein, "processor-implemented component" can refer to a hardware component implemented using one or more processors. Similarly, the methods described herein can be at least partially processor-implemented, with a particular processor or processors being an example of hardware. For example, at least some of the operations of a method can be performed by one or more processors or processor-implemented components. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API). The performance of certain of the operations can be distributed among the processors, not only residing within a single machine, but deployed across a number of machines. In some examples, the processors or processor-implemented components can be located in a single geographic location (e.g., within a home environment, an office environment, or a server farm). In other examples, the processors or processor-implemented components can be distributed across a number of geographic locations.

"Computer-readable medium" can include, for example, both machine-storage media and signal media. Thus, the terms include both storage devices/media and carrier waves/modulated data signals. The terms "machine-readable medium," "computer-readable medium" and "device-readable medium" mean the same thing and can be used interchangeably in this disclosure.

"Machine-storage medium" can include, for example, a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media, and device-storage media include non-volatile memory, including by way of example semiconductor memory devices, e.g., erasable programmable read-only memory (EPROM), electrically erasable programmable read-only memory (EEPROM), Field-Programmable Gate Arrays (FPGA), flash memory devices, Solid State Drives (SSD), and Non-Volatile Memory Express (NVMe) devices; magnetic disks such as internal hard disks and removable disks; magneto-optical disks; and CD-ROM, DVD-ROM, Blu-ray Discs, and Ultra HD Blu-ray discs. In addition, machine-storage medium can also refer to cloud storage services, Network Attached Storage (NAS), Storage Area Networks (SAN), and object storage devices. The terms "machine-storage medium," "device-storage medium," "computer-storage medium" mean the same thing and can be used interchangeably in this disclosure. The terms "machine-storage media," "computer-storage media," and "device-storage media" specifically exclude carrier waves, modulated data signals, and other such media, at least some of which are covered under the term "signal medium."

"Network" can include, for example, one or more portions of a network that can be an ad hoc network, an intranet, an extranet, a Virtual Private Network (VPN), a Local Area Network (LAN), a Wireless LAN (WLAN), a Wide Area Network (WAN), a Wireless WAN (WWAN), a Metropolitan Area Network (MAN), the Internet, a portion of the Internet, a portion of the Public Switched Telephone Network (PSTN), a Voice over IP (VoIP) network, a cellular telephone network, a 5G™ network, a wireless network, a Wi-Fi® network, a Wi-Fi 6® network, a Li-Fi network, a Zigbee® network, a Bluetooth® network, another type of network, or a combination of two or more such networks. For example, a network or a portion of a network can include a wireless or cellular network, and the coupling can be a Code Division Multiple Access (CDMA) connection, a Global System for Mobile communications (GSM) connection, or other types of cellular or wireless coupling. In this example, the coupling can implement any of a variety of types of data transfer technology, such as third Generation Partnership Project (3GPP) including 4G, fifth-generation wireless (5G) networks, Universal Mobile Telecommunications System (UMTS), High Speed Packet Access (HSPA), Long Term Evolution (LTE) standard, others defined by various standard-setting organizations, other long-range protocols, or other data transfer technology.

"Non-transitory computer-readable medium" can include, for example, a tangible medium that is capable of storing, encoding, or carrying the instructions for execution by a machine.

"Processor" can include, for example, data processors such as a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), a Quantum Processing Unit (QPU), a Tensor Processing Unit (TPU), a Neural Processing Unit (NPU), a Field Programmable Gate Array (FPGA), another processor, or any suitable combination thereof. The term "processor" can include multi-core processors that can comprise two or more independent processors (sometimes referred to as "cores") that can execute instructions contemporaneously. These cores can be homogeneous (e.g., all cores are identical, as in multicore CPUs) or heterogeneous (e.g., cores are not identical, as in many modern GPUs and some CPUs). In addition, the term "processor" can also encompass systems with a distributed architecture, where multiple processors are interconnected to perform tasks in a coordinated manner. This includes cluster computing, grid computing, and cloud computing infrastructures. Furthermore, the processor can be embedded in a device to control specific functions of that device, such as in an embedded system, or it can be part of a larger system, such as a server in a data center. The processor can also be virtualized in a software-defined infrastructure, where the processor's functions are emulated in software.

"Signal medium" can include, for example, an intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and can be used interchangeably in this disclosure.

"User device" can include, for example, a device accessed, controlled or owned by a user and with which the user interacts perform an action, engagement or interaction on the user device, including an interaction with other users or computer systems.

What is claimed is:
1. A machine-implemented method, comprising:
generating an eXtended Reality (XR) user interface of an XR system, the XR user interface including an interactive virtual object;
rendering the interactive virtual object using a first set of attributes, the first set of attributes defining the interactive virtual object as a gelatinous spheroid;
displaying the interactive virtual object to a user as a component of the XR user interface;

detecting a pinch gesture of a hand of the user in proximity to the interactive virtual object;
in response to detecting the pinch gesture, performing operations comprising:
rendering the interactive virtual object using a second set of attributes by animating compression of the interactive virtual object into an oblate spheroid; and
re-displaying the interactive virtual object to the user using the second set of attributes.

2. The machine-implemented method of claim 1, wherein the interactive virtual object is a 3D slider knob.

3. The machine-implemented method of claim 1, further comprising:
detecting a movement of the hand as the hand holds the pinch gesture;
in response to detecting the movement of the hand, rendering the interactive virtual object using a third set of attributes; and
re-displaying the interactive virtual object to the user using the third set of attributes.

4. The machine-implemented method of claim 3, further comprising:
detecting a release of the pinch gesture by the hand;
in response to detecting the release of the pinch gesture by the hand, rendering the interactive virtual object using a fourth set of attributes;
re-displaying the interactive virtual object to the user using the fourth set of attributes; and
determining a user interface interaction based on an amount the movement of the hand.

5. The machine-implemented method of claim 4, wherein the interactive virtual object is a 3D slider knob, and
wherein the fourth set of attributes define the slider knob as a spheroid.

6. The machine-implemented method of claim 1, wherein the XR system is a head-wearable apparatus.

7. A machine comprising:
at least one processor; and
at least one memory storing instructions that, when executed by the at least one processor, cause the machine to perform operations comprising:
generating an eXtended Reality (XR) user interface of an XR system, the XR user interface including an interactive virtual object;
rendering the interactive virtual object using a first set of attributes, the first set of attributes defining the interactive virtual object as a gelatinous spheroid;
displaying the interactive virtual object to a user as a component of the XR user interface;
detecting a pinch gesture of a hand of the user in proximity to the interactive virtual object;
in response to detecting the pinch gesture, performing operations comprising:
rendering the interactive virtual object using a second set of attributes by animating compression of the interactive virtual object into an oblate spheroid; and
re-displaying the interactive virtual object to the user using the second set of attributes.

8. The machine of claim 7, wherein the interactive virtual object is a 3D slider knob.

9. The machine of claim 7, wherein the operations further comprise:
detecting a movement of the hand as the hand holds the pinch gesture;
in response to detecting the movement of the hand, rendering the interactive virtual object using a third set of attributes; and
re-displaying the interactive virtual object to the user using the third set of attributes.

10. The machine of claim 9, wherein the operations further comprise:
detecting a release of the pinch gesture by the hand;
in response to detecting the release of the pinch gesture by the hand, rendering the interactive virtual object using a fourth set of attributes;
re-displaying the interactive virtual object to the user using the fourth set of attributes; and
determining a user interface interaction based on an amount the movement of the hand.

11. The machine of claim 10,
wherein the interactive virtual object is a 3D slider knob, and
wherein the set of attributes define the slider knob as a spheroid.

12. The machine of claim 7, wherein the XR system is a head-wearable apparatus.

13. A non-transitory machine-storage medium, the machine-storage medium including instructions that, when executed by a machine, cause the machine to perform operations comprising:
generating an eXtended Reality (XR) user interface of an XR system, the XR user interface including an interactive virtual object;
rendering the interactive virtual object using a first set of attributes, the first set of attributes defining the interactive virtual object as a gelatinous spheroid;
displaying the interactive virtual object to a user as a component of the XR user interface;
detecting a pinch gesture of a hand of the user in proximity to the interactive virtual object;
in response to detecting the pinch gesture, performing operations comprising:
rendering the interactive virtual object using a second set of attributes by animating compression of the interactive virtual object into an oblate spheroid; and
re-displaying the interactive virtual object to the user using the second set of attributes.

14. The non-transitory machine-storage medium of claim 13, wherein the interactive virtual object is a 3D slider knob.

15. The non-transitory machine-storage medium of claim 13, wherein the operations further comprise:
detecting a movement of the hand as the hand holds the pinch gesture;
in response to detecting the movement of the hand, rendering the interactive virtual object using a third set of attributes; and
re-displaying the interactive virtual object to the user using the third set of attributes.

16. The non-transitory machine-storage medium of claim 15, wherein the operations further comprise:
detecting a release of the pinch gesture by the hand;
in response to detecting the release of the pinch gesture by the hand, rendering the interactive virtual object using a fourth set of attributes;
re-displaying the interactive virtual object to the user using the fourth set of attributes; and
determining a user interface interaction based on an amount the movement of the hand.

17. The non-transitory machine-storage medium of claim 13, wherein the XR system is a head-wearable apparatus.

18. The machine-implemented method of claim 1, further comprising:
  determining one or more digits of the hand of the user are within proximity to the interactive virtual object; and
  rendering the interactive virtual object as an internally lighted gelatinous spheroid.

19. The machine of claim 7, the operations further comprising:
  determining one or more digits of the hand of the user are within proximity to the interactive virtual object; and
  rendering the interactive virtual object as an internally lighted gelatinous spheroid.

20. The non-transitory machine-storage medium of claim 13, the operations further comprising:
  determining one or more digits of the hand of the user are within proximity to the interactive virtual object; and
  rendering the interactive virtual object as an internally lighted gelatinous spheroid.

* * * * *